US011604392B2

(12) United States Patent
Fujikawa

(10) Patent No.: US 11,604,392 B2
(45) Date of Patent: Mar. 14, 2023

(54) ACTIVE MATRIX SUBSTRATE AND DISPLAY PANEL

(71) Applicant: SHARP KABUSHIKI KAISHA, Sakai (JP)

(72) Inventor: Yohsuke Fujikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/865,937

(22) Filed: Jul. 15, 2022

(65) Prior Publication Data

US 2022/0350214 A1 Nov. 3, 2022

Related U.S. Application Data

(63) Continuation of application No. 17/070,697, filed on Oct. 14, 2020, now Pat. No. 11,409,173, which is a
(Continued)

(30) Foreign Application Priority Data

Feb. 10, 2016 (JP) ................................ 2016-023646

(51) Int. Cl.
*G02F 1/1345* (2006.01)
*G02F 1/1362* (2006.01)
(Continued)

(52) U.S. Cl.
CPC ...... *G02F 1/136286* (2013.01); *G02F 1/1309* (2013.01); *G02F 1/1362* (2013.01);
(Continued)

(58) Field of Classification Search
CPC .......... G02F 1/136286; G02F 1/13452; G02F 1/1368; G02F 1/133512; G02F 1/133514;
(Continued)

(56) References Cited

U.S. PATENT DOCUMENTS 5,250,931 A 10/1993 Misawa et al.
6,194,837 B1 2/2001 Ozawa
(Continued)

FOREIGN PATENT DOCUMENTS

JP 2004-271847 A 9/2004
JP 2007-264447 A 10/2007
(Continued)

OTHER PUBLICATIONS

Office Action of U.S. Appl. No. 16/075,057 dated Aug. 12, 2019.
(Continued)

*Primary Examiner* — James A Dudek
(74) *Attorney, Agent, or Firm* — ScienBiziP, P.C.

(57) ABSTRACT

An array board 11*b* includes a display section AA, a source line 20 connected to the display section AA, a test circuit 40 connected to the source line 20 and configured to test the display section AA, a panel-side image input terminal that is disposed such that the test circuit 40 is between the terminal and the display section AA and to which a signal to be supplied to the source line 20 is input, a terminal connection line 51 connecting the source line 20 to the pane-side image input terminal 35A and the terminal connection line 51 including the terminal connection line 51 at least a part of which overlaps the test circuit 40 and a flattening film (insulation film) 28 at least disposed between an overlapping portion of the test circuit 40 and the terminal connection line 51.

13 Claims, 16 Drawing Sheets

Related U.S. Application Data continuation of application No. 16/884,917, filed on May 27, 2020, now Pat. No. 10,845,663, which is a continuation of application No. 16/724,331, filed on Dec. 22, 2019, now Pat. No. 10,705,398, which is a continuation of application No. 16/075,057, filed as application No. PCT/JP2017/004145 on Feb. 6, 2017, now Pat. No. 10,564,501.

(51) Int. Cl.
*G02F 1/13* (2006.01)
*G02F 1/1368* (2006.01)
*G02F 1/1343* (2006.01)
*G02F 1/1335* (2006.01)

(52) U.S. Cl.
CPC ........ *G02F 1/1368* (2013.01); *G02F 1/13452* (2013.01); *G02F 1/136259* (2013.01); *G02F 1/13629* (2021.01); *G02F 1/13685* (2021.01); *G02F 1/133512* (2013.01); *G02F 1/133514* (2013.01); *G02F 1/134336* (2013.01); *G02F 1/134372* (2021.01); *G02F 1/136227* (2013.01); *G02F 1/136254* (2021.01); *G02F 2201/121* (2013.01); *G02F 2201/123* (2013.01); *G02F 2202/104* (2013.01)

(58) Field of Classification Search
CPC ......... G02F 1/134336; G02F 2201/121; G02F 2201/123
See application file for complete search history.

(56) References Cited

U.S. PATENT DOCUMENTS

| | | |
|---|---|---|
| 9,024,913 B1 | 5/2015 | Jung et al. |
| 2001/0030635 A1 | 10/2001 | Kodate et al. |
| 2003/0151587 A1 | 8/2003 | Yamashita |
| 2004/0174183 A1 | 9/2004 | Nojiri et al. |
| 2005/0057148 A1 | 3/2005 | Seki et al. |
| 2006/0109215 A1 | 5/2006 | Tanada et al. |
| 2007/0182442 A1 | 8/2007 | Hata et al. |
| 2009/0016001 A1 | 1/2009 | Miyakawa et al. |
| 2009/0231255 A1 | 9/2009 | Tanimoto et al. |
| 2010/0006838 A1 | 1/2010 | Yoshida et al. |
| 2010/0163884 A1 | 7/2010 | Chang |
| 2015/0255487 A1 | 9/2015 | Yoshida et al. |
| 2016/0070131 A1 | 3/2016 | Kimura et al. |
| 2016/0105952 A1 | 4/2016 | Park et al. |
| 2018/0032190 A1 | 2/2018 | Koide |
| 2018/0239476 A1* | 8/2018 | Yoshida ................ H01L 27/124 |

FOREIGN PATENT DOCUMENTS

| | | |
|---|---|---|
| JP | 2010-243526 A | 10/2010 |
| JP | 2015-210811 A | 11/2015 |
| WO | 2008/015808 A1 | 2/2008 |
| WO | 2014/073483 A1 | 5/2014 |

OTHER PUBLICATIONS

Notice of Allowance of U.S. Appl. No. 16/075,057 dated Oct. 31, 2019.
Notice of Allowance of U.S. Appl. No. 16/724,331 dated Mar. 11, 2020.
Notice of Allowance of U.S. Appl. No. 16/884,917 dated Aug. 11, 2020.
Notice of Allowance of U.S. Appl. No. 17/070,697 dated Apr. 5, 2022.

* cited by examiner

ACTIVE MATRIX SUBSTRATE AND DISPLAY PANEL

TECHNICAL FIELD

The present invention relates to an active matrix substrate and a display panel.

BACKGROUND ART

Examples of known display devices are described in Patent Documents 1 and 2. Patent Document 1 describes a display device including a switching element for video signal selection which selectively connects an arbitrary source line to one of a plurality of video signal supply lines, a scan signal selection element which selectively connects an arbitrary gate line to one of a plurality of scan signal supply lines, a plurality of external signal connection terminals, and a plurality of inspection terminals. Inspection switching elements are connected to each of the plurality of video signal supply lines, and the plurality of inspection switching elements have input terminal sides connected in parallel and connected to a first inspection terminal and have control terminal sides connected in parallel and connected to a second inspection terminal, and a plurality of color selection signal supply lines are connected to a plurality of third inspection terminals, and the plurality of scan signal supply lines are connected to a plurality of fourth inspection terminals.

Patent Document 2 describes a following display device. A halfway section of a video signal wiring group lead out of a source driver between its routing position and an external connection terminal corresponding to the driver is separated, and the separated video signal wiring group is arranged as a bypass wiring group on a surface of a counter electrode substrate opposed to a liquid crystal layer. Bypass electrodes at both ends of the bypass wiring group and bypass electrodes at two ends of remaining video signal wiring groups left by parting the video signal wiring group on an array board are connected in series through a conductive member buried in a seal material. Further, the source driver on the array board and the corresponding bypass wiring group on the counter substrate are put one over the other along the width in plan view of the panel.

RELATED ART DOCUMENT

Patent Document

Patent Document 1: Japanese Unexamined Patent Application Publication No. 2010-243526
Patent Document 1: Japanese Unexamined Patent Application Publication No. 2007-264447

Problem to be Solved by the Invention

In the device described in Patent Document 1, in a peripheral section that is around the display section including the pixel electrodes and the TFTs, the signal selection circuit such as the switching element for video signal selection, the inspection circuit such as inspection switching elements, the routing lines connected to the source line, and the driver IC mounting terminal connected to the routing lines are arranged so as not to overlap each other. According to such a configuration, a frame area of the array board tends to be large and this may be a problem for achieving high display resolution.

In the device described in Patent Document 2, a part of the routing wiring group connecting the external connection terminal and the source driver is arranged as the bypass wiring group on a counter electrode substrate side opposed to the array board to reduce the frame area. However, with such a method, plane arrangement of the routing wiring group is limited and the routing wiring group has poor arrangement variety. Further, if the bypass wiring group on the counter electrode substrate side overlaps the circuit on the array board side, such a configuration is likely to be influenced by noise and measure against noise such as providing shield electrodes may be necessary.

DISCLOSURE OF THE PRESENT INVENTION

An object of the present invention is to reduce a frame area and keep variety of arrangement and receive less influence of noise.

Means for Solving the Problem

An active matrix substrate according to the present invention includes a pixel section, a pixel connection line connected to the pixel section, a test circuit connected to the pixel connection line and configured to test the pixel section, a terminal that is disposed such that the test circuit is present between the terminal and the pixel section and to which a signal to be supplied to the pixel connection line is input, a terminal connection line connecting the pixel connection line to the terminal, at least a part of the terminal connection line overlapping the test circuit, and an insulation film at least disposed between an overlapping portion of the test circuit and the terminal connection line.

The signals input to the terminal are sequentially transmitted to the terminal connection line and the pixel connection line and supplied to the pixel section. The pixel section is driven based on the supplied signals. In testing the pixel section during the manufacturing process, the test signals are supplied from the test circuit to the pixel section via the pixel connection line. The pixel section is driven based on the supplied test signals. The terminal connection line is connected to the terminal via the terminal connection line, and the test circuit is between the pixel section and the terminal. At least a part of each terminal connection line overlaps the test circuit via the insulation film. With such a configuration, compared to a configuration that the terminal connection line does not overlap the test circuit, the area for the terminal connection line and the test circuit is reduced. Accordingly, the frame area of the active matrix substrate can be reduced and display resolution can be preferably enhanced. Further, the arrangement variety of the terminal connection line and the test circuit can be increased. The test circuit is not used when the signals are input to the terminal. Therefore, the signals transmitted to the terminal connection line are not adversely affected by the noise even with the configuration that the test circuit overlaps the terminal connection line via the insulation film, and signal delay is less likely to be caused.

Following configurations may be preferable for embodiments of the present technology.

(1) The terminal may be positioned off from the pixel connection line with respect to a direction perpendicular to an extending direction in which the pixel connection line extends, and the terminal connection line may include an obliquely extending portion that extends obliquely with respect to the extending direction of the pixel connection line and the obliquely extending portion may overlap the test circuit. According to such a configuration, the obliquely extending portion is arranged with using an arrangement area of the test circuit, and a frame area can be reduced.

(2) The pixel section may include pixels that are arranged in a matrix and the pixel connection line may include multiple pixel connection lines that are connected to the pixels, respectively, the test circuit may at least include a test line extending in a direction crossing an extending direction in which the pixel connection line extends and through which test signals are transmitted, and a test switching component that is connected to the test line and the pixel connection line and configured to control supply of the test signals, and the test line may include test lines that are connected to the pixel connection lines connected to odd-numbered pixels of the pixels from an end in the extending direction of the test line and test lines that are connected to the pixel connection lines connected to even-numbered pixels of the pixels from the end. According to such a configuration, it can be tested with the test circuit whether short-circuit is caused between the odd-numbered pixels and pixel connection lines from the end with respect to the extending direction of the test line and the even-numbered pixels and pixel connection lines. Compared to a configuration including three or more test lines, the area for the test circuit can be smaller and a frame area can be preferably reduced.

(3) The pixel section may include coloring pixels of multiple colors that exhibit different colors and the pixel connection line may include multiple pixel connection lines connected to the coloring pixels of multiple colors, the test circuit may at least include a test line through which test signals are transmitted, and a test switching component that is connected to the test line and the multiple pixel connection lines and configured to control supply of the test signals, and the test line may include multiple test lines that are connected to the multiple pixel connection lines, respectively, and a number of the multiple test lines may be equal to a number of the multiple colors of the coloring pixels. According to such a configuration, with the test circuit, the single color display may be performed by driving selectively each of the single coloring pixels of multiple colors or the mixed color display may be performed by driving simultaneously the multiple coloring pixels of the multiple colors. Accordingly, various tests can be performed. In such a configuration including the same number of test lines as the number of colors of the coloring pixels, the arrangement area of the test circuit may be increased. However, as described before, the terminal connection line is arranged while overlapping the test circuit and therefore, the arrangement efficiency of the terminal connection line and the test circuit is improved and the frame area can be kept small.

(4) The pixel section may include coloring pixels of multiple colors that exhibit different colors and the pixel connection line may include multiple pixel connection lines connected to the coloring pixels of multiple colors, the active matrix substrate may further include a switching circuit arranged between the pixel section and the test circuit and connected to the respective multiple pixel connection lines and configured to supply signals selectively to the respective multiple pixel connection lines, and the terminal connection line may be connected to the pixel connection line via the switching circuit. According to such a configuration, with the switching circuit, the coloring pixels of each color can be selectively driven at certain gradation by supplying signals selectively to the pixel connection lines. In a configuration including such a switching circuit, the frame area may be increased by the arrangement area of the switching circuit. However, since the number of the terminal connection lines is greatly decreased and the terminal connection line is arranged while overlapping the test circuit as described before, the arrangement efficiency of the terminal connection line and the test circuit is improved and the frame area can be kept small.

(5) The pixel section may include pixels arranged in a matrix, the pixels may include pixel electrodes to which a potential according to a supplied signal is applied, and a common electrode to which a common potential is applied, the common electrode may include separated common electrodes that are arranged in a matrix and in an area ranging the pixel electrodes, the pixel connection line may include multiple pixel electrode pixel connection lines connected to the pixel electrodes and multiple common electrode pixel connection lines connected to the respective separated common electrodes, and the terminal connection line may include at least terminal connection lines connected to the pixel electrode pixel connection lines or terminal connection lines connected to the common electrode pixel connection lines. According to such a configuration, the pixel electrodes are supplied with a potential according to the signal supplied via the pixel electrode pixel connection lines, and the separated common electrodes included in the common electrodes are supplied with a common potential supplied via the common electrode pixel connection lines. Display with gradation according to the potential difference between each pixel electrode and the common electrode is performed in each pixel. In a configuration that the terminal connection lines including terminal connection lines connected to the pixel electrode pixel connection lines, signals supplied to the terminal are transmitted to the pixel electrode pixel connection lines via the terminal connection lines overlapping the test circuit. In a configuration that the terminal connection lines including terminal connection lines connected to the common electrode pixel connection lines, the common potential supped to the terminals is transmitted to the common electrode pixel connection lines via the terminal connection lines that overlap the test circuit.

(6) The terminal connection lines may selectively include the terminal connection lines connected to the common electrode pixel connection lines, the test circuit may be connected to the pixel electrode pixel connection lines and configured to test the pixel electrode pixel connection lines, and the active matrix substrate may further include a second test circuit arranged between the test circuit and the pixel section and configured to test the common electrode pixel connection lines, and the terminal connection lines connected to the common electrode pixel connection lines may be arranged while overlapping the second test circuit in addition to the test circuit via the insulation film. According to such a configuration, it can be tested with the second test circuit whether short-circuit is caused between the adjacent separated common electrodes and it can be tested with the test circuit whether short-circuit is caused between the adjacent pixel electrodes. In such a configuration including the second test circuit, the frame area may be increased by the arrangement area for the second test circuit. However, the terminal connection lines are disposed while overlapping the test circuit and the second test circuit so that the arrangement efficiency of the terminal connection lines, the test circuit, and the second test circuit is improved and the frame area can be kept small.

Next, to solve the above problem, a display panel according to the present technology includes the above-described active matrix substrate, and a counter board bonded to the active matrix substrate. According to the display panel having such a configuration, the active matrix substrate has a reduced frame area and a design property of the display panel is improved.

Advantageous Effect of the Invention

According to the present invention, a frame area is reduced and variety of arrangement is kept and less influence of noise is received.

MODES FOR CARRYING OUT THE INVENTION

First Embodiment

Figure 1:
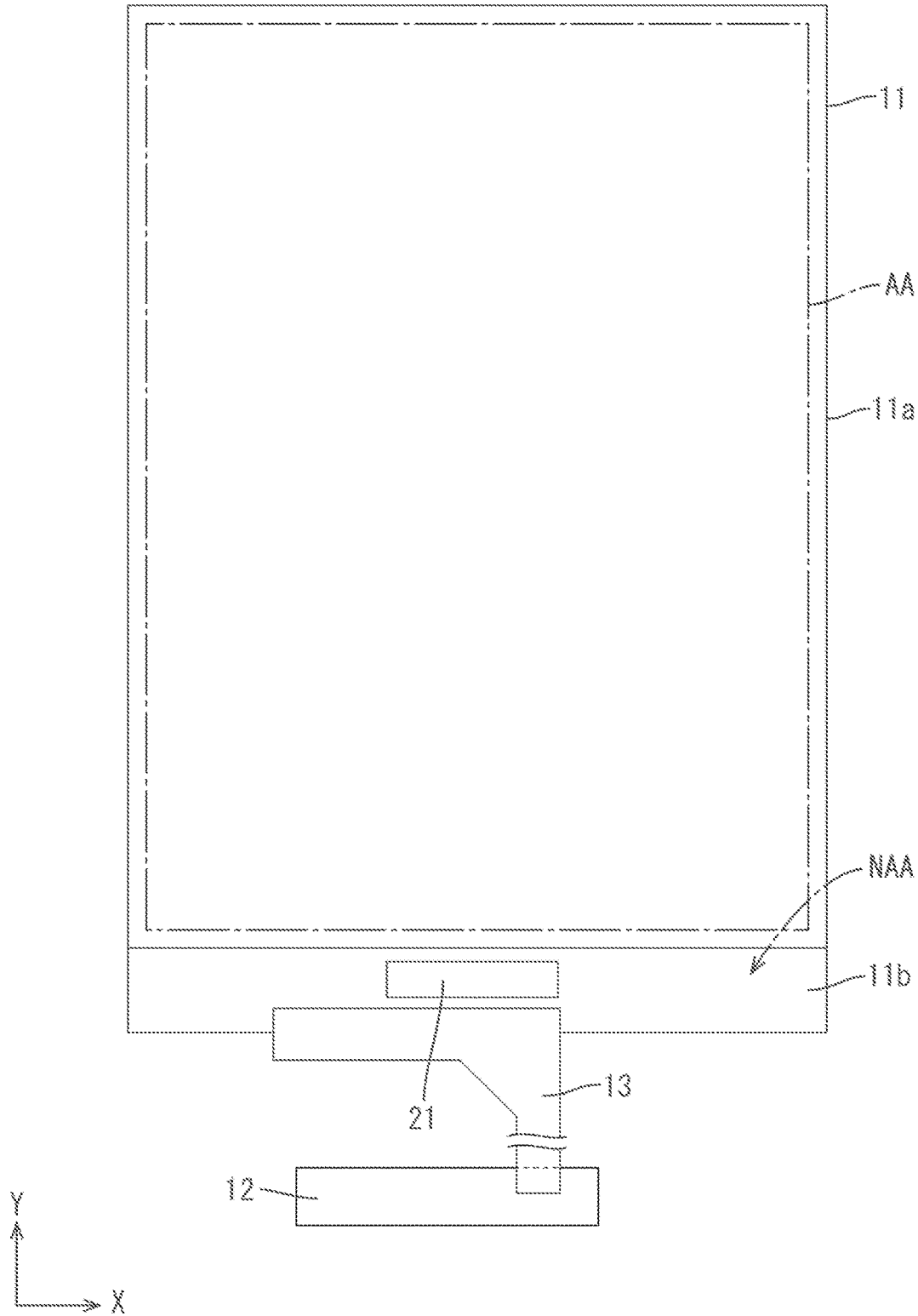
FIG. 1 is a general plan view illustrating a connection structure of a liquid crystal panel including a driver, a flexible printed circuit board, and a control circuit board according to a first embodiment of the present invention.

A first embodiment of the present technology will be described with reference to FIGS. 1 to 12. In this embodiment, a liquid crystal display device 10 will be described as an example. X-axis, Y-axis and Z-axis may be present in the drawings and each of the axial directions represents a direction represented in each drawing. A vertical direction is referred to FIG. 2 and an upper side and a lower side in FIG. 2 correspond to a front side and a back side, respectively.

Figure 2:
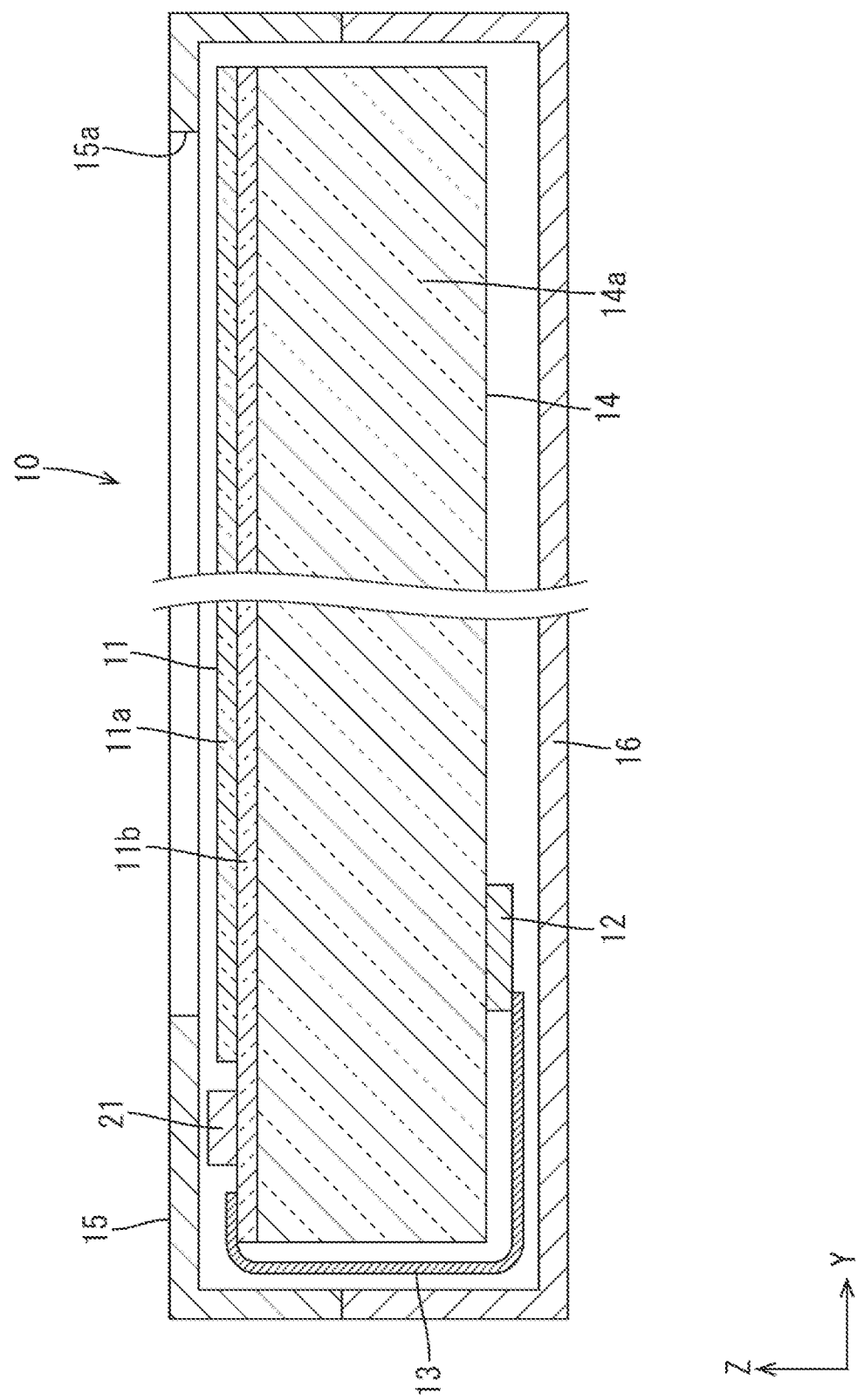
FIG. 2 is a general cross-sectional view illustrating a cross-sectional configuration of a liquid crystal display device taken along a long-side direction thereof.

As illustrated in FIGS. 1 and 2, the liquid crystal display device 10 includes a liquid crystal panel (display panel) 11, a driver (a pixel driving section) 21 driving the liquid crystal panel 11, a control circuit board (an external signal supply source) 12 supplying various kinds of input signals from outside to the liquid crystal panel 11 including the driver 21, the flexible printed circuit board (an external connection part) 13 electrically connecting the liquid crystal panel 11 and the external control circuit board 12, a backlight unit (a lighting device) 14 that is an external light source supplying light to the liquid crystal panel 11. The liquid crystal display device 10 further includes a pair of front and rear exterior members 15, 16 to hold the liquid crystal panel 11 and the backlight unit 14 that are attached together. The front exterior member 15 has an opening hole 15a through which images displayed on the liquid crystal panel 11 can be seen from the outside.

Next, a configuration of the backlight unit 14 will be briefly described. As illustrated in FIG. 2, the backlight unit 14 includes a chassis 14a that has a substantially box shape opening toward the front side (toward the liquid crystal panel 11), a light source (such as cold cathode tubes, LEDs, organic EL, not illustrated) not illustrated and arranged within the chassis 14a, and an optical member (not illustrated) arranged to cover an opening hole of the chassis 14a. The optical member is configured to convert light rays from the light source into planar light.

Figure 7:
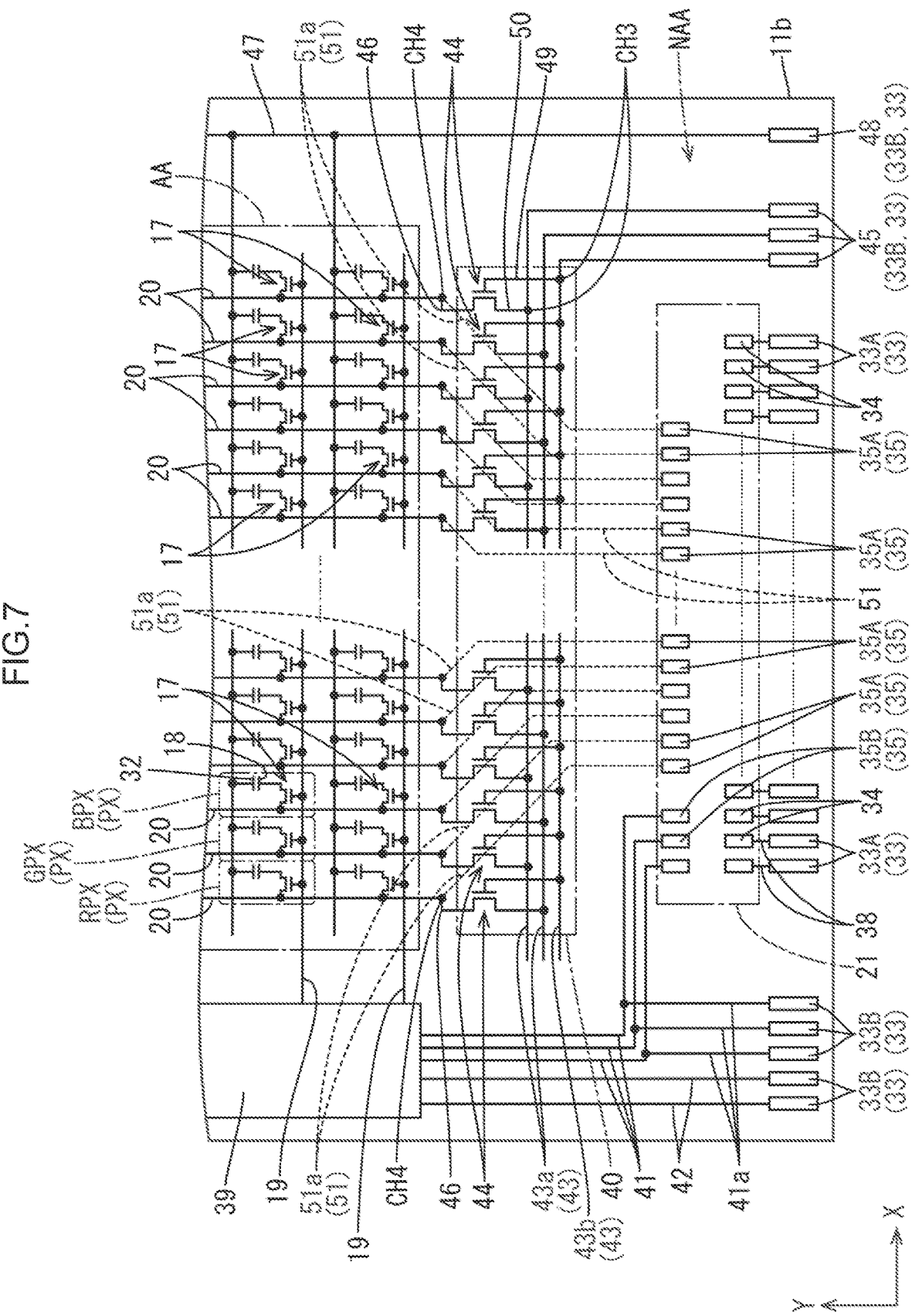
FIG. 7 is a plan view illustrating a configuration of traces in a mounting area of the array board where the driver and the flexible printed circuit board are mounted.

The liquid crystal panel 11 will be described. As illustrated in FIG. 1, the liquid crystal panel 11 has a vertically-long square (rectangular) shape as a whole. The liquid crystal panel 11 includes a display section (a pixel section, an active area, a display area) AA that is off centered toward one of ends of a short dimension thereof (the upper side in FIG. 1). The driver 21 and the flexible printed circuit board 13 are arranged at the other end of the short dimension of the liquid crystal panel 11 (the lower side in FIG. 1). An area of the liquid crystal panel 11 outside the display section AA is a non-display section (non-active area, a non-display area) NAA in which images are not displayed. A short-side direction and a long-side direction of the liquid crystal panel 11 correspond to the X-axis direction and the Y-axis direction in each drawing. In FIGS. 1 and 7, a dot-and-dash line box slightly smaller than a CF board 11a indicates an outline of the display section AA. An area outside the dot-and-dash line is the non-display section NAA.

Figure 3:
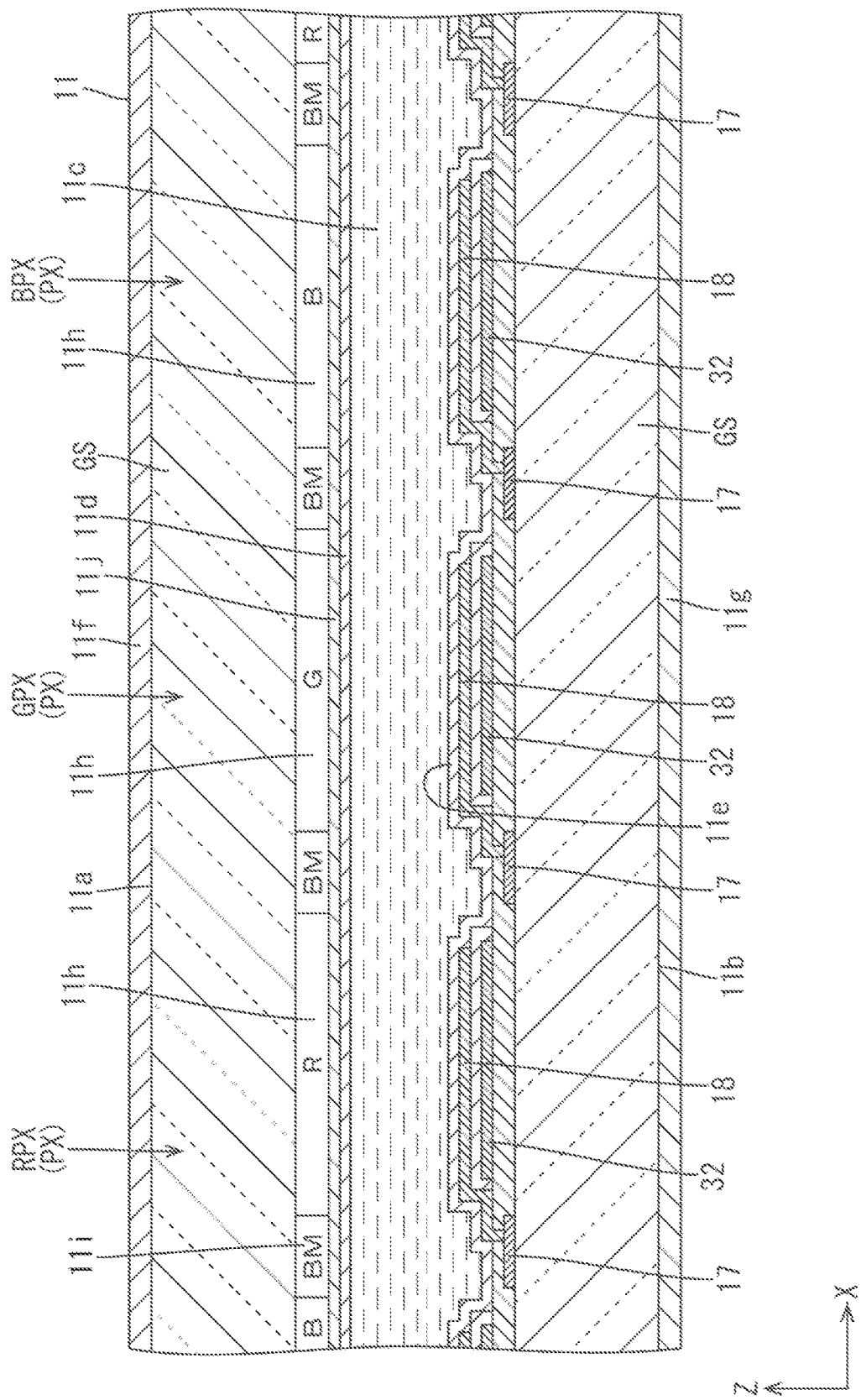
FIG. 3 is a general cross-sectional view illustrating a cross-sectional configuration of a display part of the liquid crystal panel.

As illustrated in FIG. 3, the liquid crystal panel 11 includes a pair of transparent substrates (having high transmissivity) 11a and 11b, and a liquid crystal layer 11c between the substrates 11a and 11b. The liquid crystal layer 11c includes liquid crystal molecules having optical characteristics that vary according to application of electric field. The substrates 11a and 11b are bonded together with a sealing agent, which is not illustrated, with a gap therebetween. The substrates 11a, 11b include a CF board (a counter board) 11a on the front and an array board (an active matrix substrate, a component substrate) 11b on a back side. As illustrated in FIGS. 1 and 2, the CF board 11a has a short-side dimension that is substantially equal to that of the array board 11b and has a long-side dimension smaller than that of the array board 11b. The CF board 11a is bonded to the array board 11b such that one of the short-side edges (an upper side in FIG. 1) of each of the substrates is aligned with each other. Accordingly, edge portion of the array board 11b on another one of the short-side edges (a lower side in FIG. 1) does not overlap the CF board 11a over a certain area and front and rear plate surfaces thereof are exposed outside. Such a certain area of the array board is a mounting area for the driver 21 and the flexible printed circuit board 13 (an arrangement area of terminals 33-35). Alignment films 11d and 11e are formed on inner surfaces of the substrates 11a and 11b, respectively, for aligning the liquid crystal molecules included in the liquid crystal layer 11c. Polarizing plates 11f and 11g are bonded to outer surfaces of the substrates 11a and 11b, respectively.

Figure 4:
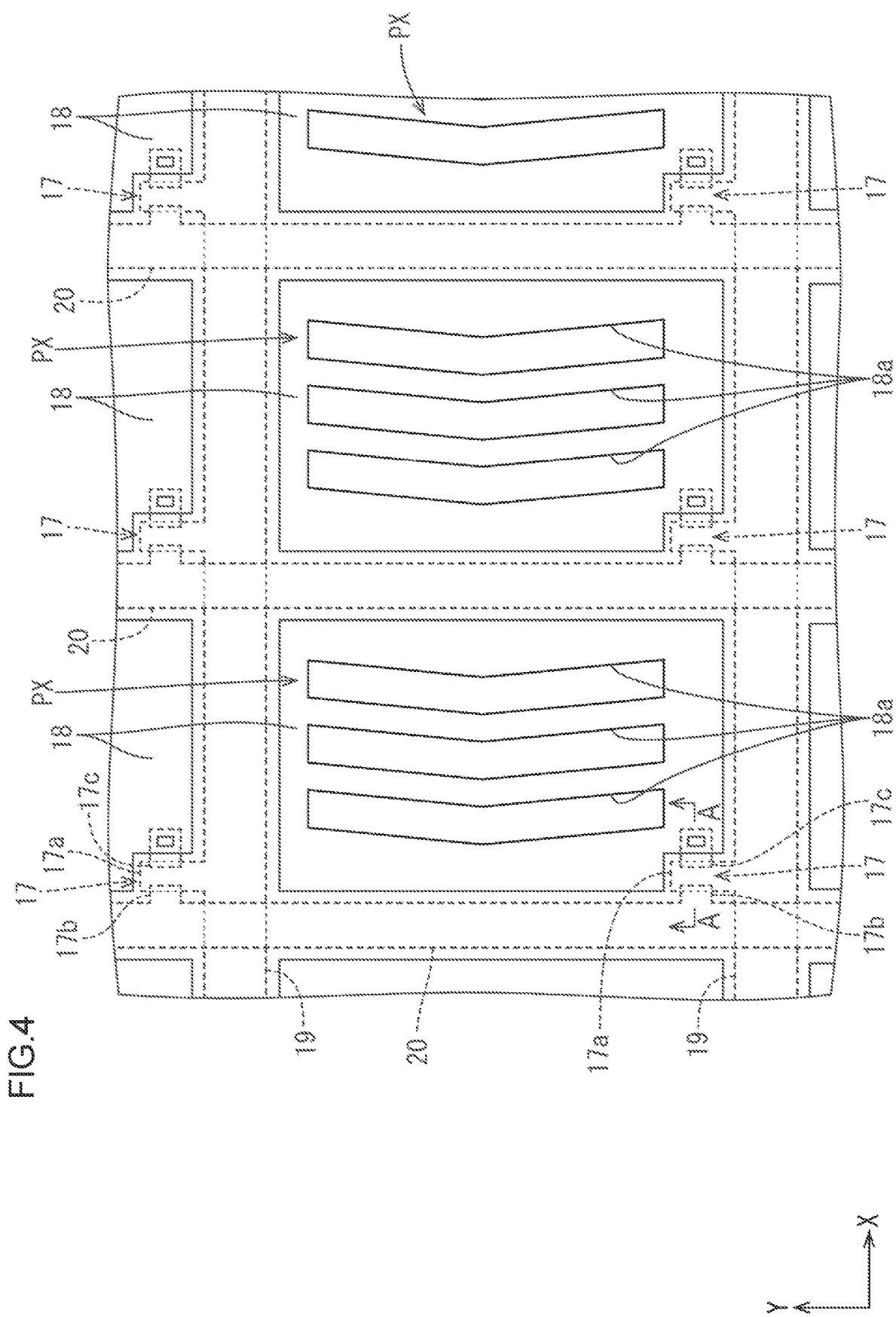
FIG. 4 is a general plan view illustrating a trace structure in a display section of an array board of the liquid crystal panel.

Next, configurations of the array board 11b and the CF board 11a in the display section AA will be described. As illustrated in FIGS. 3 and 4, a number of pixel TFTs (thin film transistors) 17 that are switching components (display components) and a number of pixel electrodes 18 are arranged in a matrix on the inner surface of the array board 11b (the liquid crystal layer 11c side, the opposed surface side opposed to the CF board 11a). Furthermore, the gate lines (row control lines, scan lines) 19 and the source lines (pixel connection lines, column control lines, data lines) 20 are arranged in a grid to surround the pixel TFTs 17 and the pixel electrodes 18. Namely, the pixel TFTs 17 and the pixel electrodes 18 are arranged at the respective intersections of the gate lines 19 and the source lines 20 in a grid. The pixel TFTs 17 and the pixel electrodes 18 are arranged in a matrix in rows and columns (the X-axis direction and the Y-axis direction). A common electrode 32 is disposed on the array board 11b and an electric field is formed between the common electrode 32 and the pixel electrode 18 according to the supply of a common potential (a reference potential). In this embodiment, a driving type of the liquid crystal panel 11 is a fringe filed switching (FFS) type that is a mode improved from an in-plane switching (IPS) mode. The pixel electrodes 18 and the common electrode 32 are formed on the array board 11b side and the pixel electrodes 18 and the common electrode 32 are included in different layers. The pixel electrode 18 has slits 18a that are arranged at intervals and each of which extends obliquely with respect to the X-axis direction and the Y-axis direction in the plan view. If potential difference is generated through the slits 18a between the pixel electrode 18 and the common electrode 32 that is included in different layers, a fringe field (an oblique field) including a component in a direction normal to a plate surface of the array board 11b is applied to the liquid crystal layer in addition to a component in a direction along the plate surface of the array board 11b. The alignment state of the liquid crystal molecules included in the liquid crystal layer 11c can be switched appropriately with using the fringe filed.

Figure 5:
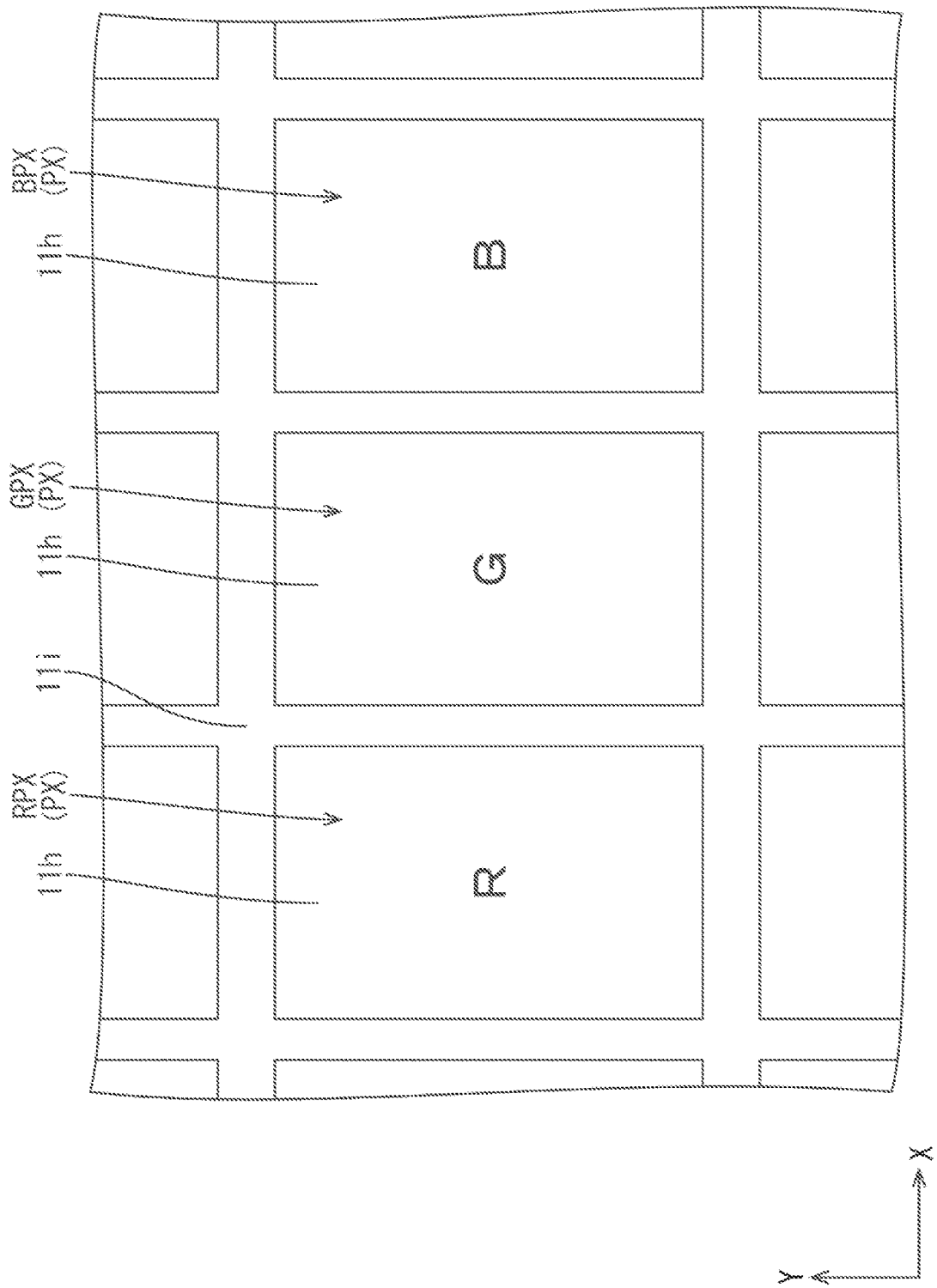
FIG. 5 is an enlarged plan view illustrating a planar configuration of the display section of a CF board of the liquid crystal panel.

As illustrated in FIGS. 3 and 5, color filters 11h are formed on the CF board 11a. The color filters 11h include red (R), green (G), and blue (B) color portions that are arranged in a matrix and in rows (the X-axis direction) and columns (the Y-axis direction) to overlap the pixel electrodes 18 on the array board 11b in a plan view. A light blocking layer 11i having a grid shape (a black matrix) is formed between the color portions included in the color filters 11h for reducing color mixture. The light blocking layer 11i is arranged while overlapping the gate lines 19 and the source lines 20 in a plan view. An overcoat film (a flattening film) 11j is formed on inner surfaces of the color filters 11h and the light blocking layer 11i.

Figure 6:
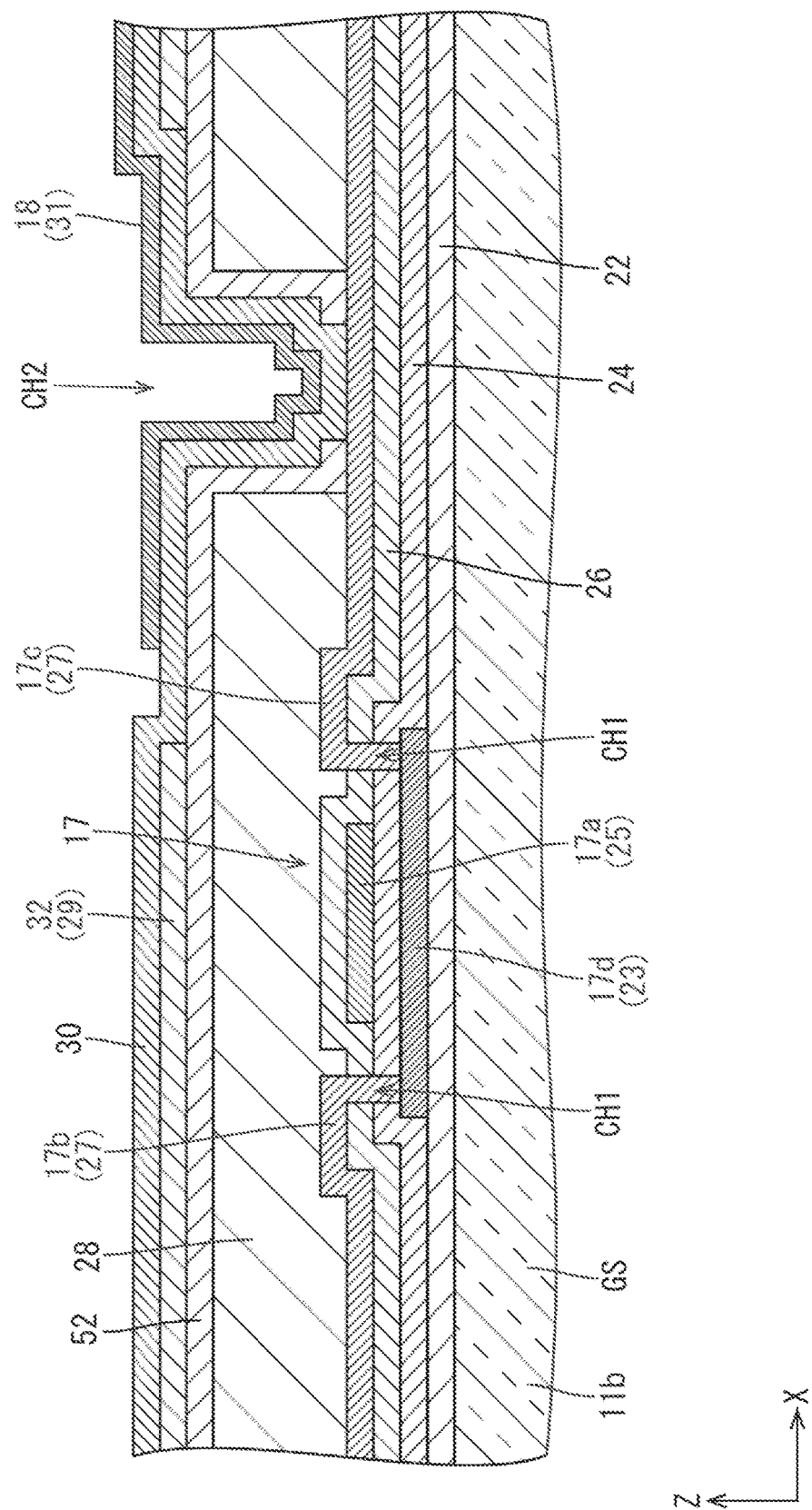
FIG. 6 is a cross-sectional view of the array board of the liquid crystal panel taken along line A-A in FIG. 4.

Next, the various films formed in layers on the inner surface side of the array board 11b with the known photolithography method will be described. A specific layering order of the films will be described. Components for a function of displaying images (displaying function) among functions of the liquid crystal panel 11 are mainly included in the array board 11b. As illustrated in FIG. 6, on the array board 11b, the following films are at least formed in the following sequence from the lowest layer (the glass substrate GS side, a rear side): a basecoat film 22, a semiconductor film 23, a gate insulation film (an insulation film) 24, a first metal film (a gate metal film) 25, a first interlayer insulation film (an inorganic insulation film) 26, a second metal film (a source metal film) 27, a flattening film (an organic insulation film) 28, a first transparent electrode film 29, a second interlayer insulation film (an inorganic insulation film) 30, and a second transparent electrode film 31 are at least formed in layers. As is not illustrated, the alignment film 11e is included in an upper layer of the second interlayer insulation film 30 and the second transparent electrode film 31. An insulation film 52 is disposed on the flattening film 28 such that a third metal film 53, which will be described layer, is insulated from other conductive films. The third metal film 53 is between the flattening film 28 and the insulation film 52.

The basecoat film 22 is provided in a solid pattern covering an entire surface of the glass substrate GS of the array board 11b, and is made of silicon oxide (SiO$_2$), silicon nitride (SiNx), or silicon nitrified oxide (SiON). As illustrated in FIG. 6, the semiconductor film 23 is disposed on an upper layer side of the basecoat film 22 and formed with patterning in the display section AA and the non-display section NAA. The semiconductor film 23 is formed with patterning in an island form according to the arrangement of the pixel TFTs 19 in at least the display section AA. The semiconductor film 23 is made of a continuous grain (CG) silicon thin film that is a kind of a polycrystallized silicon film (a polycrystalline silicone film). The CG silicon film is formed as follows. Metal material is added to an amorphous silicon thin film and the additive is subjected to a heating process at a low temperature of 550° C. or lower for a short time. Accordingly, atomic arrangement at a crystal grain boundary of the silicon crystals has continuity. The gate insulation film 24 is arranged on an upper layer side of the basecoat film 22 and the semiconductor film 23 and formed in a solid pattern in an area ranging over the display section AA and the non-display section NAA. For example, the gate insulation film 24 is made of SiO$_2$.

As illustrated in FIG. 6, the first metal film 25 is arranged on an upper layer side of the gate insulation film 24 and disposed in each of the display section AA and the non-display section NAA with patterning. The first metal film 25 is made of metal material having a high melting point and large sheet resistance such as tantalum (Ta) or tungsten (W). The gate lines 19 are formed of the first metal film 25. The first interlayer insulation film 26 is arranged on an upper layer side of the gate insulation film 24 and the first metal film 25 and is formed in a solid pattern disposed in an area ranging over the display section AA and the non-display section NAA. The first interlayer insulation film 26 is made of silicon oxide (SiO$_2$). The insulation between the crossing portions of the gate lines 19 and the source lines 20 is maintained by the first interlayer insulation film 26. The second metal film 27 is arranged on an upper layer side of the first interlayer insulation film 26 and is disposed in each of the display section AA and the non-display section NAA with patterning. The second metal film 27 is made of metal material that is easily corrosive and has small sheet resistance such as aluminum (Al) or chromium copper (Cr). The source lines 20 and other components are formed of the second metal film 27. The flattening film 28 that is an insulation film is arranged on an upper layer side of the first interlayer insulation film 26 and the second metal film 27 and is formed in a solid pattern disposed in an area ranging over the display section AA and the non-display section NAA. The flattening film 28 is made of acrylic resin such as polymethyl methacrylate resin (PMMA). The flattening film 28 has a film thickness relatively greater than those of the insulation films 24, 26, 30 that are inorganic insulation films. Therefore, the surface of the array board 11b facing the liquid crystal layer 11c (on which the alignment film is disposed) can be effectively flattened by the flattening film 28. In a configuration including the lines made of the third metal film 53, a capacitance composition is generated in a section where the lines overlap the lines made of the first metal film 25 or the second metal film 27. However, the flattening film 28 that is relatively thick can reduce a load caused by the capacitance composition. The third metal film 53 can be disposed on any other conductive film as long as having an insulation film therebetween. However, the third metal film 53 is preferably disposed on the flattening film 28 due to the above reason.

As illustrated in FIG. 6, the first transparent electrode film 29 is arranged on an upper layer side of the flattening film 28 and formed in a substantially solid pattern at least in the display section AA. The first transparent electrode film 29 is made of transparent electrode material such as indium tin oxide (ITO) or zinc oxide (ZnO). The common electrode 32 that is formed in a substantially solid pattern is formed of the first transparent electrode film 29. The second interlayer insulation film 30 is arranged on an upper layer side of the flattening film 28 and the first transparent electrode film 29 and formed in a solid pattern in an area ranging the display section AA and the non-display section NAA. The second interlayer insulation film 30 is made of silicon nitride ($SiN_x$). The second transparent electrode film 31 is arranged on an upper layer side of the second interlayer insulation film 30 and formed in an island form in the display section AA with patterning according to the arrangement of the pixel TFTs 17. The second transparent electrode film 31 is made of transparent electrode material similar to that of the first transparent electrode film 29. The pixel electrodes 18 are formed of the second transparent electrode film 31. Holes such as contact holes CH1, CH2 are formed at certain positions in the gate insulation film 24, the first interlayer insulation film 26, the flattening film 28, and the second interlayer insulation film 30 with patterning in the process of producing the array board 11b.

The pixel TFT 17 disposed in the display section AA of the array board 11b is a so-called top-gate type (a staggered type) TFT. As illustrated in FIG. 6, such a pixel TFT 17 includes a channel portion 17d formed of the semiconductor film 23, the gate electrode 17a, the source electrode 17b, and the drain electrode 17c. The gate electrode 17a is disposed to overlap the channel portion 17d on an upper layer side while having the gate insulation film 24 therebetween. The source electrode 17b and the drain electrode 17c are disposed on an upper layer side of the gate electrode 17a via the first interlayer insulation film 26. The gate electrode 17a is made of the first metal film 25, and the source electrode 17b and the drain electrode 17c are made of the second metal film 27. Among them, the source electrode 17b and the drain electrode 17c are connected to the channel portion 17d through the contact hole CH1 that is formed in the gate insulation film 24 and the first interlayer insulation film 26. Accordingly, electrons move between the source electrode 17b and the drain electrode 17c. The semiconductor film 23 of the channel portion 17d is made of the CG silicon thin film, as described before. The CG silicon thin film has electron mobility of 200 to 300 $cm^2/Vs$, for example, that is higher than that of an amorphous silicon film. The pixel TFT 17 including the semiconductor film 23 made of the CG silicon thin film as the channel portion 17d can be easily downsized and an amount of transmitted light through each pixel electrode 18 can be increased to a maximum level. This configuration is preferable for enhancement of image resolution and reduction of power consumption. The pixel electrode 18 formed of the second transparent electrode film 31 is connected to the drain electrode 17c of the pixel TFT 17 through the contact hole CH2 formed in the flattening film 28 and the second interlayer insulation film 30 and the insulation film 52, which will be described later. Accordingly, if power is supplied to the gate electrode 17a of the pixel TFT 17, current flows between the source electrode 17b and the drain electrode 17c via the channel portion 17d and a certain potential is applied to the pixel electrode 18. The common electrode 32 formed of the first transparent electrode film 29 overlaps the pixel electrodes 18 in a plan view and the common electrode 32 and the pixel electrodes 18 sandwich the second interlayer insulation film 30 therebetween. The common electrode 32 that is disposed in a solid pattern has holes in portions overlapping the respective contact holes CH2 of the flattening film 28 and the second interlayer insulation film 30. The contact portions of the pixel electrodes 18 pass through the holes of the common electrode 32.

As illustrated in FIGS. 3 to 5, the pixel TFT 17, the pixel electrode 18 and the common electrode 32 disposed on the array board 11b form the pixel PX and the pixel PX is a coloring pixel that exhibits a color corresponding to the coloring portion of the color filter 11h opposite the pixel electrode 18 of the pixel PX. The pixels PX include a red pixel (the coloring pixel) RPX exhibiting red, a green pixel (the coloring pixel) GPX exhibiting green, and a blue pixel (the coloring pixel) exhibiting blue. The three pixels form one display unit and the pixels are arranged in repeated sequence along the row direction (the X-axis direction) and the column direction (the Y-axis direction). Among the pixels PX arranged in rows and columns, the pixels PX arranged in the row direction that are connected to the same gate line 19 form a row of pixels and the pixels PX arranged in the column direction that are connected to the same source line 20 form a column of pixels. Therefore, each pixel TFT 17 of the pixels PX included in a row of pixels is provided with scan signals from the same gate line 19, and each pixel TFT 17 of the pixels PX included in a column of pixels is provided with image signals (data signals, video signals) from the same source line 20. Rows of pixels are arranged in the column direction and columns of pixels are arranged in the row direction. Adjacent pixels PX included in the row of pixels have different colors and adjacent pixels PX included in the column of pixels have a same color.

Next, the components connected to the liquid crystal panel 11 will be described. As illustrated in FIG. 2, the control circuit board 12 is mounted on the back surface of the chassis 14a (an outer surface on a side opposite from the liquid crystal panel 11) of the backlight unit 14 with screws. The control circuit board 12 includes a substrate made of paper phenol or glass epoxy resin and electronic components mounted on the substrate and configured to supply various input signals to the driver 21. Traces (electrically conductive paths) which are not illustrated are formed in predetermined patterns on the substrate. An end (one end side) of the flexible printed circuit board 13 is electrically and mechanically connected to the control circuit board 12 via an anisotropic conductive film (ACF), which is not illustrated.

As illustrated in FIG. 2, the flexible printed circuit board (an FPC board) 13 includes a base member made of synthetic resin having insulating property and flexibility (e.g., polyimide resin). A number of traces are formed on the base member (not illustrated). The end of the long dimension of the flexible printed circuit board 13 is connected to the control circuit board 12 disposed on the back surface of the chassis 14*a* as described above. The other end (other end side) of the long dimension of the flexible printed circuit board 13 is connected to the array board 11*b* in the liquid crystal panel 11. The flexible printed circuit board 13 is bent or folded back inside the liquid crystal display device 10 such that a cross-sectional shape thereof forms a U-like shape. At the ends of the long dimension of the flexible printed circuit board 13, portions of the traces are exposed to the outside and configured as terminals (not illustrated). The terminals are electrically connected to the control circuit board 12 and the array board 11*b*. With this configuration, input signals supplied by the control circuit board 12 are transmitted to the liquid crystal panel 11.

As illustrated in FIG. 1, the driver 21 is an LSI chip including drive circuits. The driver 21 is configured to operate according to signals supplied by the control circuit board 12, which is a signal source, to process the input signal supplied by the control circuit board 12, to generate output signals, and to output the output signals to the display section AA in the liquid crystal panel 11. The driver 21 has a laterally-long rectangular shape (an elongated shape that extends along the short side of the liquid crystal panel 11) in a plan view. The driver 21 is directly connected to the non-display section NAA of the array board 11*b* of the liquid crystal panel 11, that is, mounted by the chip-on-glass (COG) mounting method. A long-side direction and a short-side direction of the driver 21 correspond to the X-axis direction (the short-side direction of the liquid crystal panel 11) and the Y-axis direction (the long-side direction of the liquid crystal panel 11), respectively.

Figure 8:
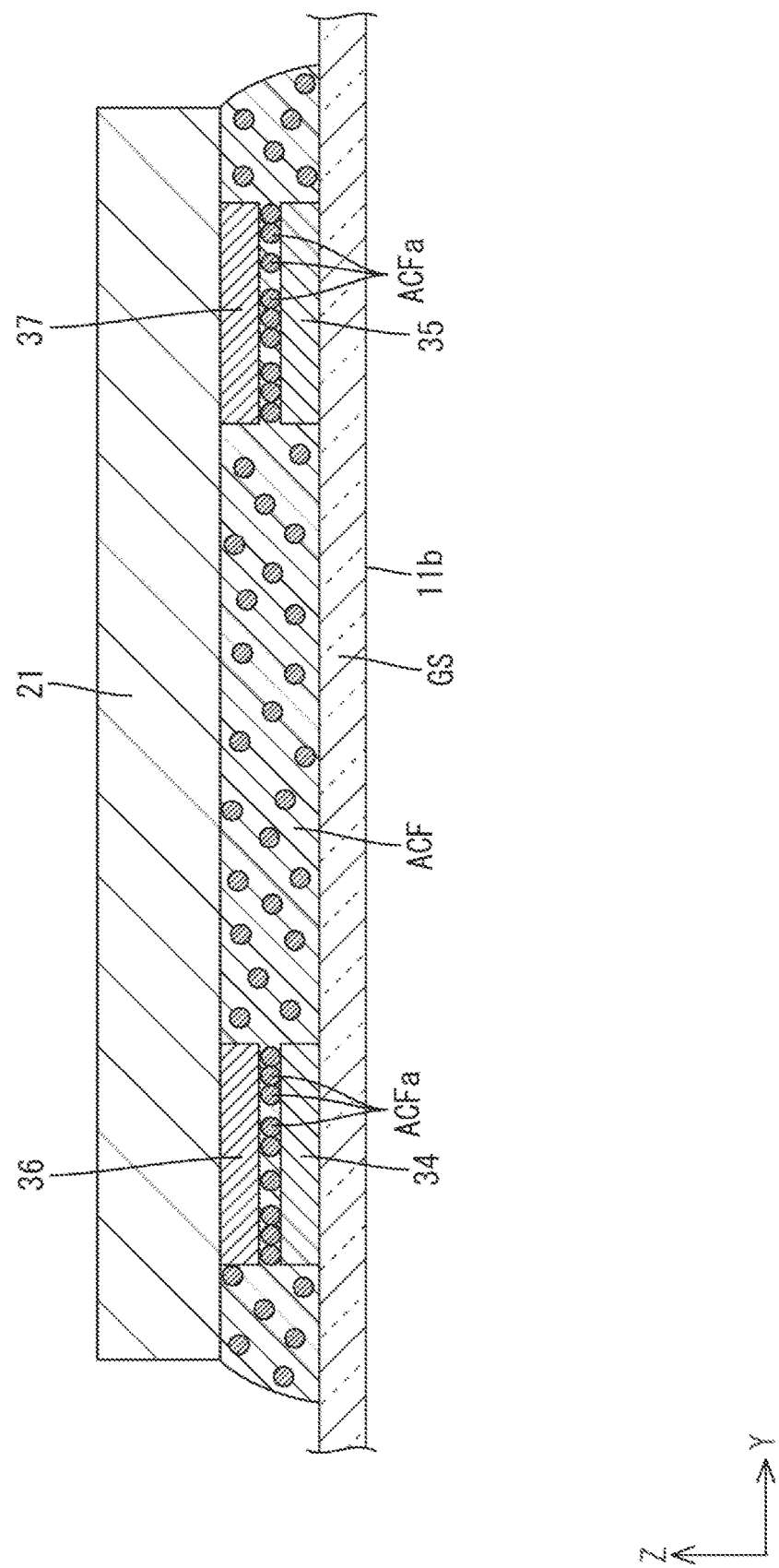
FIG. 8 is a cross-sectional view illustrating the driver and the array board taken along Y-axis direction.

Next, a connection structure of the flexible printed circuit board 13 and the driver 21 to the non-display section NAA of the array board 11*b* will be described. As illustrated in FIG. 1, the edge portion of the flexible printed circuit board 13 and the driver 21 are mounted on the non-overlapping portion of the non-display section NAA of the array board 11*b* not overlapping the CF board 11*a*. The edge portion of the flexible printed circuit board 13 is along the short-side edge of the array board 11*b* (the X-axis direction) and the driver 21 is arranged on the array board 11*b* to have a predetermined distance from the flexible printed circuit board 13 and the display section AA with respect to the Y-axis direction. As illustrated in FIG. 7, external connection terminals 33 that receive supply of the input signals from the flexible printed circuit board 13 are formed in the mounting area for the flexible printed circuit board 13 on the array board 11*b*. Panel-side output terminals 34 for outputting signals to the driver 21 and panel-side input terminals (a terminal) 35 where signals from the driver 21 are input are arranged in the mounting area for the driver 21 on the array board 11*b*. Some of the external connection terminals 33 are electrically connected to the panel-side output terminals 34 via connection lines 38 that are routed to cross a section between the mounting area for the flexible printed circuit board 13 and the mounting area for the driver in the non-display section NAA. As illustrated in FIG. 8, a driver-side input terminal 36 that is electrically connected to the panel-side output terminal 34 and a driver-side output terminal 37 that is electrically connected to the panel-side input terminal 35 are arranged on the driver 21. The driver 21 is illustrated with a dot-and-dash line in FIG. 7. In FIG. 7, a dot-and-dash line surrounding the group of traces for displaying including the gate lines 19 and the source lines 20 represents an outline of the display section AA and the area outside the dot-and-dash line is the non-display section NAA.

As illustrated in FIG. 7, the external connection terminals 33, the panel-side output terminals 34, the panel-side input terminals 35, and the connection lines 38 are made of the first metal film 25 same as the gate lines 19 and surfaces thereof are covered with the transparent electrode material (the first transparent electrode film 29 or the second transparent electrode film 31) such as ITO or ZnO similarly to the pixel electrodes 18 or the common electrode 32. The external connection terminals 33, the panel-side output terminals 34, the panel-side input terminals 35, and the connection lines 38 are formed on the array board 11*b* by patterning using a known photolithography method at the same time when the gate lines 19 and the pixel electrodes 18 are formed by patterning in a manufacturing process of the liquid crystal panel 11 (the array board 11*b*). The external connection terminals 33 include driver external connection terminals 33A and non-driver external connection terminals 33B. The driver external connection terminals 33A are connected to the panel-side output terminals 34 via the connection lines 38 and supply signals to the driver 21. The non-driver external connection terminals 33B supply source power to the components other than the driver 21, for example, gate circuit 39. The non-driver external connection terminals 33B include a common electrode terminal 48 that is connected to an end of the common electrode connection line 47 connected to the common electrode 32.

As illustrated in FIG. 8, the panel-side output terminals 34 and the panel-side input terminals 35 are covered with an anisotropic conductive film ACF. The driver-side input terminals 36 of the driver 21 are electrically connected to the panel-side output terminals 34 and the driver-side output terminals 37 are connected to the panel-side input terminals 35 via conductive particles ACFa included in the anisotropic conductive film ACF. As is not illustrated, the external connection terminals 33 have a cross-sectional structure including the first metal film 25 and the transparent electrode material (the first transparent electrode film 29 or the second transparent electrode film 31) similar to the panel-side output terminal 34 and the panel-side input terminal 35. The external connection terminals 33 are electrically connected to the terminals of the flexible printed circuit board 13 via the anisotropic conductive film. As illustrated in FIG. 7, the panel-side output terminals 34 and the panel-side input terminals 35 are arranged in a section of the non-display section of the array board 11*b* overlapping the driver 21 in a plan view, that is, in the mounting area for the driver 21. The panel-side output terminals 34 and the panel-side input terminals 35 are arranged at a predetermined interval in the Y-axis direction (in an arrangement direction in which the driver 21 and the display section AA are arranged). The panel-side output terminals 34 are arranged closer to the flexible printed circuit board 13 in the mounting area for the driver 21 of the array board 11*b* and the panel-side input terminals 35 are arranged closer to the display section AA. The panel-side output terminals 34 and the panel-side input terminals 35 are arranged at a predetermined interval linearly in the X-axis direction, that is, along the long-side direction of the driver 21 (a direction perpendicular to the arrangement direction of the driver 21 and the display section AA), respectively.

As illustrated in FIG. 7, the panel-side input terminals 35 include panel-side image input terminals 35A and panel-side control input terminals 35B. Image signals (data signals, video signals) included in the output signals output from the driver 21 are input to the panel-side image input terminals 35A. Control signals included in the output signals from the driver 21 are input to the panel-side control input terminals 35B. The panel-side image input terminals 35A are arranged from the right end one (one end) of the panel-side input terminal 35 group toward the left side in FIG. 7 with respect to the X-axis direction at intervals. Most of (a large number of) the terminals in the panel-side input terminal 35 group are the panel-side image input terminals 35A. Three panel-side control input terminals 35B are arranged from the left end one (another end) of the panel-side input terminal 35 group toward the right side in FIG. 7 with respect to the X-axis direction at intervals. Some of (a small number of) the terminals in the panel-side input terminal 35 group are the panel-side control input terminals 35B. The panel-side image input terminals 35A and the panel-side control input terminals 35B are arranged at a same position with respect to the Y-axis direction and arranged linearly along the X-axis direction.

As illustrated in FIG. 8, the driver-side input terminals 36 and the driver-side output terminals 37 are made of metal material having good conductivity such as gold and formed in a bump projecting from a bottom surface of the driver 21 (a surface opposite the array board 11b). The driver-side input terminals 36 and the driver-side output terminals 37 are connected to a process circuit included in the driver 21. Input signals input from the driver-side input terminals 36 are processed via the process circuit and the processed signals are output to the driver-side output terminals 37. The driver-side input terminals 36 and the driver-side output terminals 37 are arranged linearly at a certain interval in the X-axis direction or the long-side direction of the driver 21, respectively, similarly to the panel-side output terminals 34 and the panel-side input terminals 35.

As illustrated in FIG. 7, a gate circuit 39 that is connected to the gate lines 19 of the display section AA and a test circuit 40 that is connected to the source lines 20 are arranged in sections of the non-display section NAA of the array board 11b that are adjacent to the short-side section and the long-side section of the display section AA, respectively. The gate circuit 39 and the test circuit 40 are monolithically fabricated on the array board 11b. The gate circuit 39 and the test circuit 40 include a CG silicone thin film (the semiconductor film 23) similar to the pixel TFT 17 as a base. Therefore, the gate circuit 39 and the test circuit 40 are formed on the array board 11b with the known photolithography method simultaneously when the metal films 25, 27, the insulation films 24, 26, and the semiconductor film 23 are formed with patterning during the process of manufacturing the array board 11b.

As illustrated in FIG. 7, the gate circuit 39 is next to the left long-side section of the display section AA and is arranged in a vertically elongated rectangular area that extends in the Y-axis direction. The gate circuit 39 is connected to the gate lines 19 arranged in the display section AA and connected to gate circuit control lines 41 and gate circuit power source lines 42 arranged in the non-display section NAA. The signals (such as clock signals) for controlling driving of the gate circuit 39 are supplied through the gate circuit control lines 41, and the gate circuit control lines 41 are connected to the gate circuit 39 at one ends thereof and to the panel-side control input terminals 35B at another ends thereof. The gate circuit control lines 41 are connected to gate circuit test lines 41a for supplying test signals to the gate circuit 39, and each end of the gate circuit test lines 41a is connected to some of the non-driver external connection terminals 33B. Source power is supplied to the gate circuit 39 through the gate circuit power source lines 42. The gate circuit power source lines 42 are connected to the gate circuit 39 at one ends thereof and connected to some of the non-driver external connection terminals 33B at another ends thereof. The gate circuit 39 includes a scanning circuit and scan signals supplied via the gate circuit control lines 41 are supplied to each gate line 19 at certain timing and each gate line 19 is scanned sequentially via the scanning circuit. Specifically, the gate lines 19 are arranged in the Y-axis direction in the display section AA of the array board 11b. The gate circuit 39 scans the gate lines 19 by sequentially supplying the scan signals included in the output signals via the scanning circuit from the driver 21 to the gate lines 19 sequentially from the upper most one to the lowest one in FIG. 7 (FIG. 1) in the display section AA. The gate circuit 39 may include ancillary circuits such as a level-shifter circuit and a buffer circuit.

As illustrated in FIG. 7, the test circuit 40 is next to the lower short-side section of the display section AA including pixels PX and is arranged in a horizontally elongated rectangular area extending in the row direction (the X-axis direction). The test circuit 40 is connected to the source lines 20 arranged in the display section AA to test the pixel TFTs 17 included in the pixels PX and the source lines 20 in the display section AA. The test circuit 40 at least includes test lines 43, test TFTs (test switching components) 44, and test terminals 45. The test lines 43 extend in the X-axis direction that is perpendicular to (crosses) the Y-axis direction or the extending direction of the source lines 20 and test signals are transmitted through the test lines 43. The test TFTs 44 are connected to the test lines 43 and the source lines 20 and configured to control the supply of the test signals. The test terminals 45 are connected to ends of the test lines 43 opposite from the test TFTs 44. On the test circuit 40, the test lines 43 are arranged relatively closer to the panel-side input terminals 35 and the test TFTs 44 are relatively closer to the display section AA. The test lines 43 of the test circuit 40 according to this embodiment are made of the second metal film 27 and the test terminals 45 have a single-layered structure of the first metal film 25 or a multiple-layered structure of the first metal film 25 and the transparent electrode material (the first transparent electrode film 29 or the second transparent electrode film 31).

Figure 10:
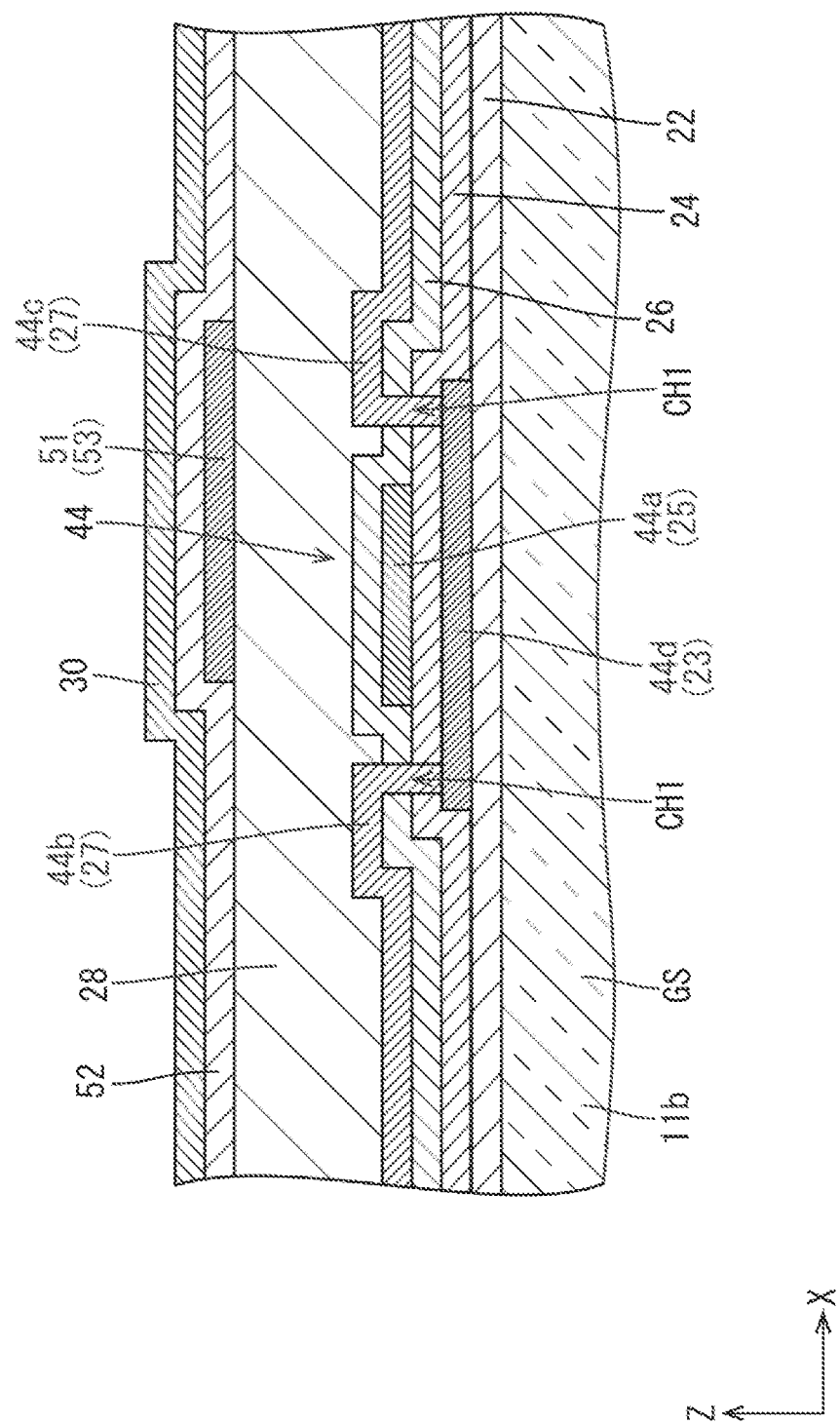
FIG. 10 is a cross-sectional view illustrating a cross-sectional configuration of a test TFT of the array board.

As illustrated in FIG. 7, the test TFTs 44 are arranged linearly along the X-axis direction (the extending direction of the test lines 43) and the number of the test TFTs 44 is equal to that of the source lines 20. Namely, each of the test TFTs 44 supplies test signals to each of the source lines 20 independently. As illustrated in FIG. 10, the test TFT 44 includes a channel section 44d made of the semiconductor film 23, a gate electrode 44a, a source electrode 44b, and a drain electrode 44c. The gate electrode 44a is disposed on and overlaps the channel section 44d via the gate insulation film 24. The source electrode 44b and the drain electrode 44c are included in an upper layer of the gate electrode 44a via the first interlayer insulation film 26. The test TFT 44 has a same configuration as the pixel TFT 17 other than that the drain electrode 44c is not connected to the pixel electrode 18, and will not be described in detail. The semiconductor film 23 is formed in an island form with patterning according to the arrangement of the test TFTs 44 in the non-display section NAA. As illustrated in FIG. 7, the gate electrode 44a of the test TFT 44 is connected to one among the test lines 43 (a gate-side test line 43b) for transmitting ON/OFF signals to the test TFT 44 via a gate relay line 49. Similarly, the source electrode 44b of the test TFT 44 is connected to ones among the test lines 43 (a source-side test line 43a) for transmitting test signals via a source relay line 50. The drain electrode 44c of the test TFT 44 is connected to the source line 20 via a drain relay line 46. The drain relay line 46 is bent substantially at a right angle between the drain electrode 44c and a connection point connected to the source line 20. The drain relay line 46 is made of the second metal film 27 similar to the drain electrode 44c and the source line 20.

Figure 9:
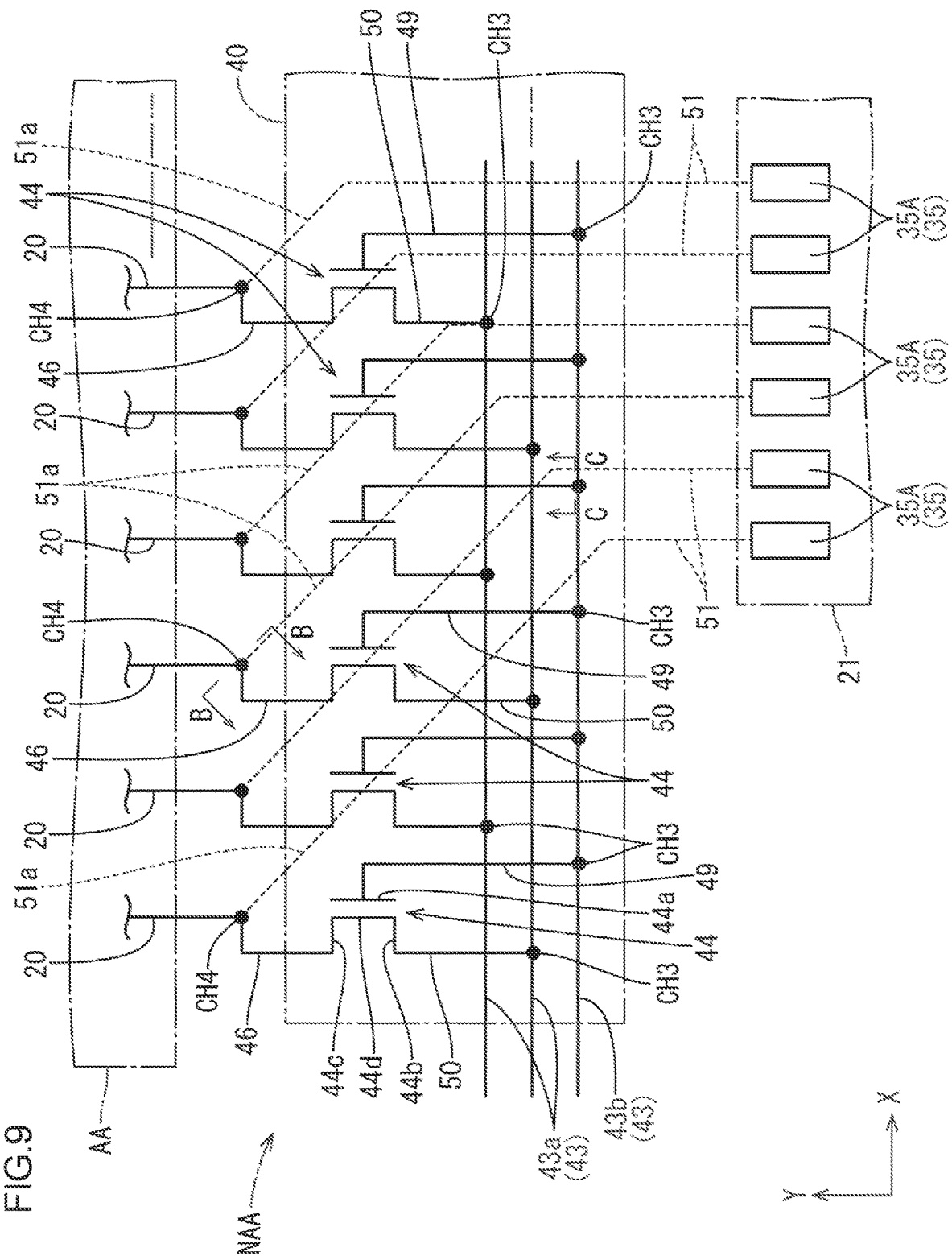
FIG. 9 is an enlarged plan view illustrating a section near a test circuit in FIG. 7.
Figure 12:
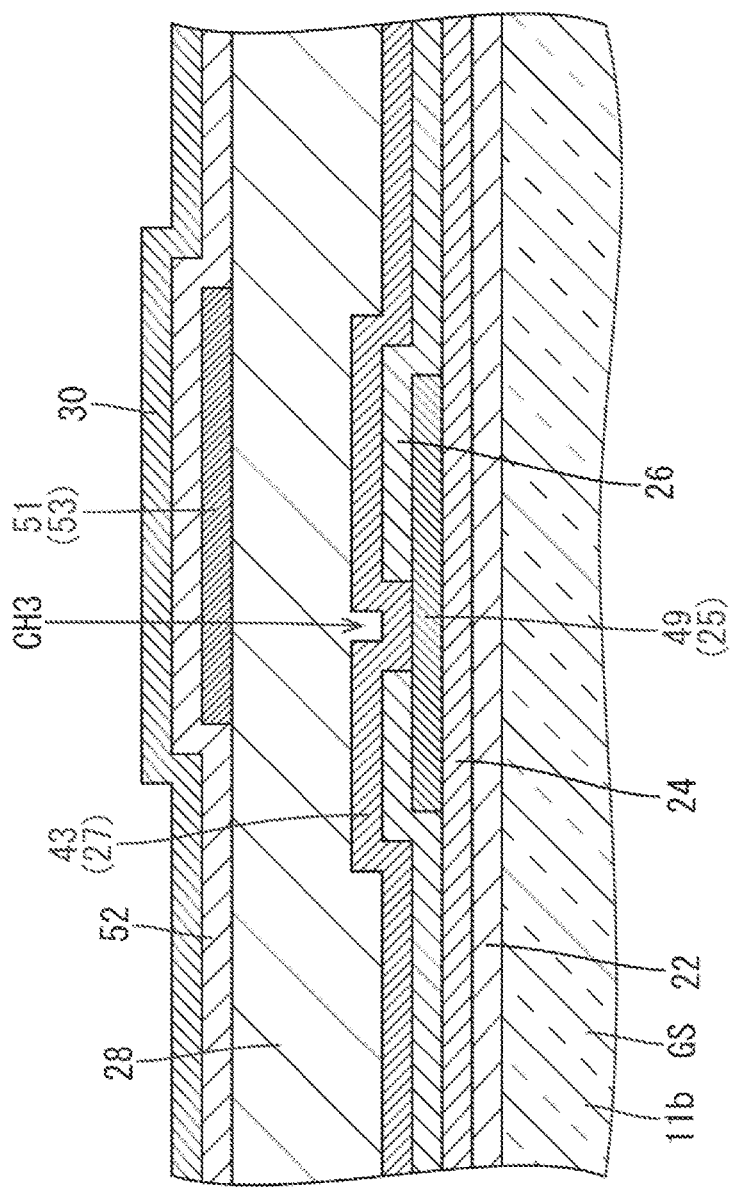
FIG. 12 is a cross-sectional view taken along line C-C in FIG. 9.

As illustrated in FIG. 9, the gate relay line 49 crosses a source-side test line 43a that is connected to the source electrode 44b, and the gate relay line 49 is made of the first metal film 25 that is included in a lower layer than the second metal film 27 forming the source-side test line 43a. According to such a configuration, the first interlayer insulation film 26 is between the gate relay line 49 and the source-side test line 43a and insulation is established therebetween. As illustrated in FIG. 12, a contact hole CH3 is formed in a section of the first interlayer insulation film 26 where the gate relay line 49 and the gate-side test line 43b are overlap and connection is established at the overlapped section. The source relay line 50 may cross the source-side test line 43a and is made of the first metal film 25 that is included in a lower layer than the second metal film 27 forming the source-side test line 43a. Therefore, the first interlayer insulation film 26 is present between the source relay line 50 and the source-side test line 43a that is not connected to the source relay line 50 and insulation is established therebetween. A contact hole is formed at a section overlapping the source relay line 50 and the source-side test line 43a that is to be connected to the source relay line 50 to establish connection. A cross sectional configuration thereof is similar to that of the contact hole CH3 illustrated in FIG. 12 and will not be described.

As illustrated in FIG. 7, the test circuit 40 includes three test lines 43 (a source-side test line 43a and a gate-side test line 43b) that are parallel to each other. One of them is a gate-side test line 43b and one end thereof is connected to the gate electrode of the test TFT 44 and another two of them are source-side test lines 43a and one ends thereof are connected to the source electrodes 44b. One of the two source-side test lines 43a that are to be connected to the source electrodes 44b is connected to the source line 20 connected to an odd-numbered pixel PX from an end (a left end in FIG. 7) with respect to the X-axis direction (the extending direction of the test line 43) and the other one is connected to the source line 20 connected to an even-numbered pixel PX from the end. According to such a configuration, if test signals are supplied alternately to the two source-side test lines 43a that are to be connected to the source electrodes 44b, the odd-numbered pixels PX and the even-numbered pixels PX from the end with respect to the X-axis direction are alternately driven according to the test signals. Therefore, it can be tested with the test circuit 40 whether short-circuit is caused between the odd-numbered pixel PX and source line 20 from the end with respect to the X-axis direction and the even-numbered pixel PX and source line 20. Compared to a configuration including three or more test lines, the area for the test circuit 40 can be smaller and a frame area can be preferably reduced. Another end of each test line 43 extends outside the test circuit 40 such that the test lines 43 are connected to the test terminals 45. The test terminals 45 are some of the non-driver external connection terminals 33B and the test signals supplied from the flexible printed circuit board 13 are input to the test terminals 45. The number of the test terminals 45 is equal to that of the test lines 43.

As illustrated in FIG. 7, terminal connection lines 51 connecting the source lines 20 and the panel-side image input terminals 35A are arranged in the non-display section NAA of the array board 11b. The signals input from the driver 21 to the panel-side image input terminals 35A are transmitted to the source lines 20 via the terminal connection lines 51 and the pixels PX connected to the source lines 20 are driven according to the transmitted signals. The terminal connection lines 51 are connected to any of the red pixels RPX, the green pixels GPX, and the blue pixels BPX via the source lines 20. The terminal connection lines 51 are arranged while overlapping the test circuit 40 via the insulation film 52. Compared to a configuration that the terminal connection lines do not overlap the test circuit 40 and are arranged next to the test circuit 40 in the Y-axis direction, the area in the Y-axis direction required for arranging the terminal connection lines 51 and the test circuit 40 is reduced. Accordingly, the frame area of the array board 11b can be reduced and image resolution can be preferably enhanced. Further, variety of design of the terminal connection lines 51 and the test circuit 40 is effectively increased. The test circuit 40 is not used when the signals are input to the panel-side image input terminals 35A, and OFF voltage is applied to the test circuit 40 from the test terminals 45 such that the test TFTs 44 are always OFF. Therefore, even if the test circuit 40 is overlapped with the terminal connection lines 51 via the flattening film 28, the signals transmitted to the terminal connection lines 51 are less likely to be influenced by noise and display unevenness is less likely to be caused by the test circuit 40. The terminal connection lines 51 are illustrated with broken lines in FIG. 7.

Figure 11:
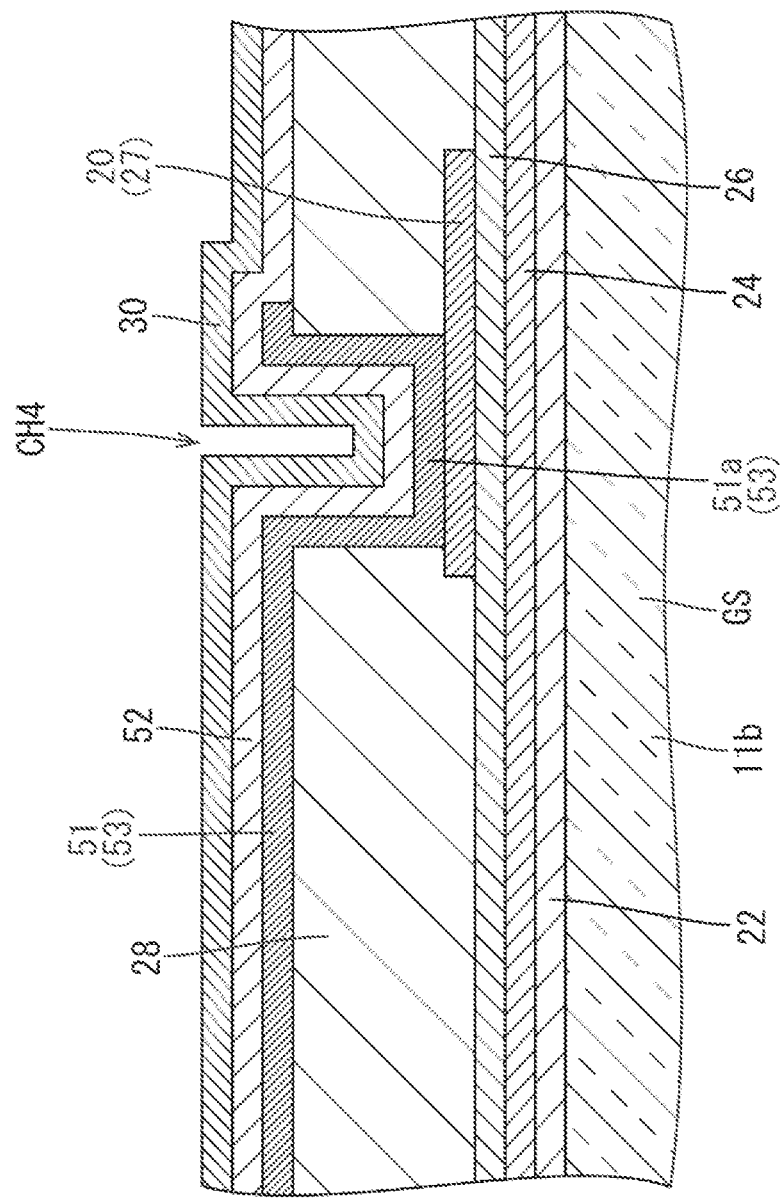
FIG. 11 is a cross-sectional view taken along line B-B in FIG. 9.

In detail, as illustrated in FIG. 11, the terminal connection lines 51 are made of the third metal film 53 that is included in an upper layer than the first metal film 25 and the second metal film 27. The insulation film 52 is disposed to cover the third metal film 53. Material for the third metal film 53 is selected such that an etchant used for the patterning does not adversely affect the circuit or lines that are already formed. Material for the insulation film 52 is appropriately selected from the same point of view.

As illustrated in FIGS. 9 and 11, the terminal connection lines 51 are arranged such that ends thereof opposite from the panel-side image input terminal 35A side overlap the ends of the source lines 20 and the overlapped portions are connected to each other.

As illustrated in FIG. 9, the panel-side image input terminals 35A are positioned off from the source lines 20 in the X-axis direction (the direction perpendicular to the extending direction of the source lines 20), respectively. The terminal connection lines 51 include obliquely extending portions 51a that extend obliquely with respect to the Y-axis direction (the extending direction of the source lines 20) and the obliquely extending portions 51a overlap the test circuit 40. In detail, the obliquely extending portions 51a of the terminal connection lines 51 extend a certain distance from the connection points connected to the source lines 20 (the contact holes CH4) toward the panel-side image input terminals 35A. Most part of the obliquely extending portion 51a overlaps the test circuit 40. According to such a configuration, the obliquely extending portions 51a of the terminal connection lines 51 can be provided with using the arrangement area of the test circuit 40. The terminal connection lines 51 disposed on the array board 11*b* are arranged such that the obliquely extending portions 51*a* form a plan view fan shape.

As is described before, the array board (the active matrix substrate) 11*b* of this embodiment includes the display section (a pixel section) AA, the source lines (the pixel connection lines) 20 connected to the display section AA, the test circuit 40 that is connected to the source lines 20 and configured to test the display section AA, the panel-side image input terminals (terminals) 35A that are arranged while sandwiching the test circuit 40 with the display section AA and to which signals supplied to the source lines 20 are input, the terminal connection lines 51 connecting the source lines 20 to the panel-side image input terminals 35A and a part of the terminal connection line being overlapped with the test circuit 40, and the flattening film (an insulation film) 28 being at least between the overlapped portion of the test circuit 40 and the terminal connection lines 51.

The signals input to the panel-side image input terminals 35A are sequentially transmitted to the terminal connection lines 51 and the source lines 20 and supplied to the display section AA. The display section AA is driven based on the supplied signals. In testing the display section AA during the manufacturing process, the test signals are supplied from the test circuit 40 to the display section AA via the source lines 20. The display section AA is driven based on the supplied test signals. The source lines 20 are connected to the panel-side image input terminals 35A via the terminal connection lines 51, and the test circuit 40 is between the display section AA and the panel-side image input terminals 35A. At least a part of each terminal connection line 51 overlaps the test circuit 40 via the flattening film 28. With such a configuration, compared to a configuration that the terminal connection lines do not overlap the test circuit 40, the area for the terminal connection lines 51 and the test circuit 40 is reduced. Accordingly, the frame area of the array board 11*b* can be reduced and display resolution can be preferably enhanced. Further, the arrangement variety of the terminal connection lines 51 and the test circuit 40 can be increased. The test circuit is not used when the signals are input to the panel-side image input terminals 35A. Therefore, the signals transmitted to the terminal connection lines 51 are not adversely affected by the noise even with the configuration that the test circuit 40 overlaps the terminal connection lines 51 via the flattening film 28.

The panel-side image input terminals 35A are positioned off from the source lines 20 with respect to the direction perpendicular to the extending direction of the source lines 20. The terminal connection lines 51 include the obliquely extending portions 51*a* extending obliquely with respect to the extending direction of the source lines 20 and the terminal connection lines 51 are arranged such that the obliquely extending portions 51*a* overlap the test circuit 40. According to such a configuration, the obliquely extending portions 51*a* are arranged with using the arrangement area for the test circuit 40 and the frame area can be reduced.

The display section AA includes the pixels PX that are arranged in a matrix and the source lines 20 are connected to the respective pixels PX. The test circuit 40 at least includes the test lines 43 and the test TFTs (test switching components) 44. The test lines 43 extend in the direction crossing the extending direction of the source lines 20 and the test signals are transmitted through the test lines 43. The test TFTs 44 are connected to the test lines 43 and the source lines 20 and configured to control the supply of the test signals. The test lines 43 include ones that are connected to the source lines 20 connected to the odd-numbered pixels PX from the end of the pixels PX with respect to the extending direction of the test lines 43 and ones that are connected to the source lines 20 connected to the even-numbered pixels PX from the end. According to such a configuration, it can be tested with the test circuit 40 whether short-circuit is caused between the odd-numbered pixels PX and source lines 20 from the end with respect to the extending direction of the test lines 43 and the even-numbered pixels PX and source lines 20. Compared to a configuration including three or more test lines 43, the area for the test circuit 40 can be smaller and a frame area can be preferably reduced.

The liquid crystal panel (the display panel) 11 of this embodiment includes the above-described array board 11*b* and the CF board (a counter board) 11*a* that is bonded to the array board 11*b*. According to the liquid crystal panel 11 having such a configuration, the array board 11*b* has a reduced frame area and a design property of the liquid crystal panel 11 is improved.

Second Embodiment

A second embodiment of the present invention will be described with reference to FIG. 13. A configuration of a test circuit 140 is altered in the second embodiment. Configurations, operations, and effects similar to those of the first embodiment will not be described.

Figure 13:
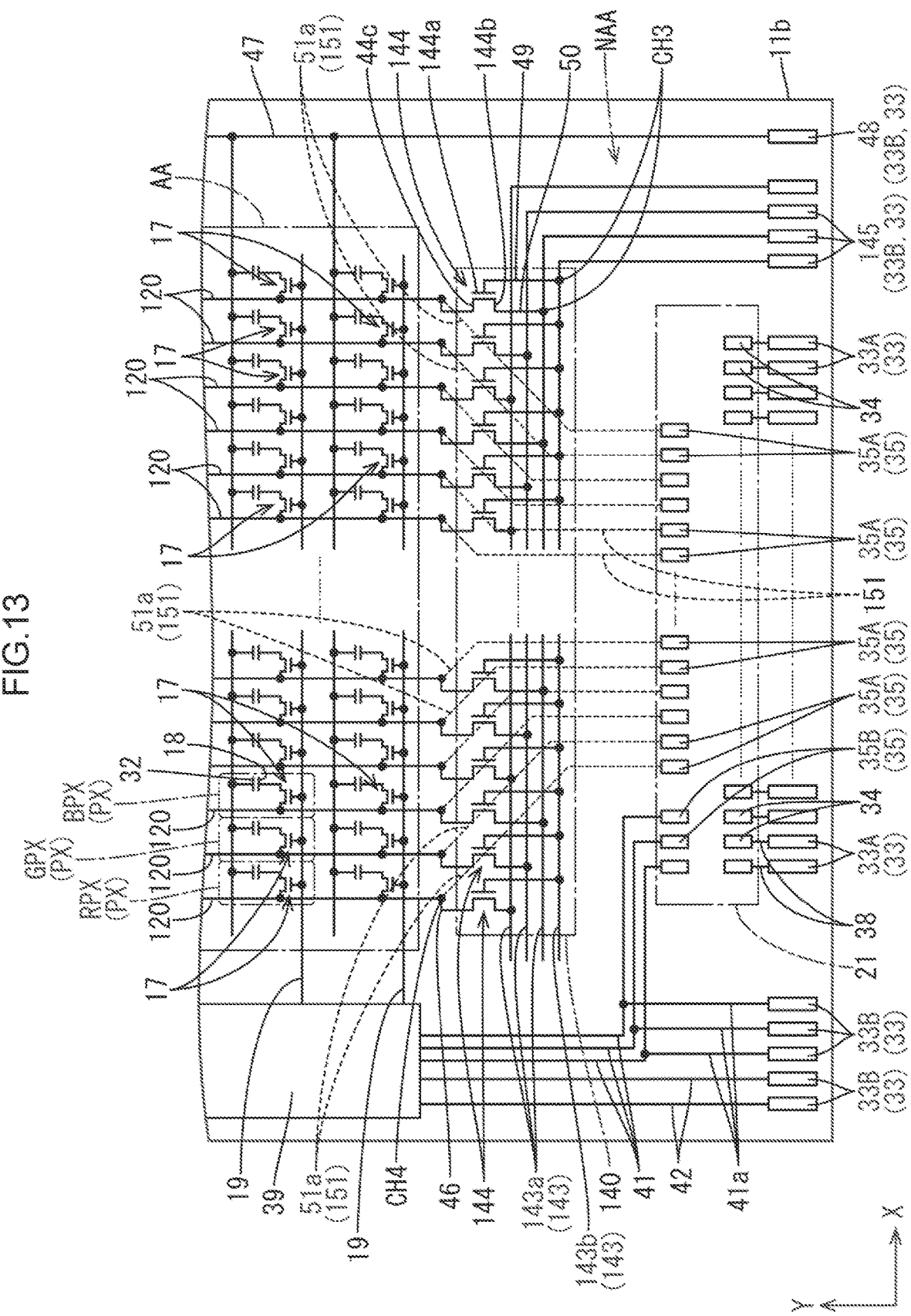
FIG. 13 is a plan view illustrating a configuration of traces in a mounting area of an array board where the driver and the flexible printed circuit board are mounted according to a second embodiment of the present invention.

As illustrated in FIG. 13, the test circuit 140 includes test lines 143 that are to be connected to source electrodes 144*b* of test TFTs 144 and the same number of the test lines 143 are provided as the number of colors exhibited by the pixels PX. Namely, the test lines 143 includes three test lines (source-side test lines 143*a*) that are to be connected to the source electrodes 144*b* and one test line (a gate-side test line 143*b*) that is to be connected to the gate electrode 144*a* and a total of the test lines 143 is four. In this embodiment, the number of test lines 143 is greater than that in the first embodiment by one and the arrangement area of the test circuit 140 may be increased. However, terminal connection lines 151 are arranged while overlapping the test circuit 140 similar to the first embodiment and therefore, the arrangement efficiency of the terminal connection lines 151 and the test circuit 140 is improved and the frame area can be kept small.

The three source-side test lines 143*a* that are to be connected to the source electrodes 144*b* include a test line to be selectively connected to the source line 120 connected to the red pixel RPX, a test line to be selectively connected to the source line 120 connected to the green pixel GPX, and a test line to be selectively connected to the source line 120 connected to the blue pixel BPX. The red pixel RPX, the green pixel GPX, and the blue pixel BPX are sequentially driven by the test signals by supplying the test signals sequentially to the three source-side test lines 143*a* that are to be connected to the source electrodes 144*b* and single color display can be performed with each color of the pixels RPX, GPX, BPX. Accordingly, it can be tested whether short-circuit is caused between the pixels RPX, GPX, BPX of each color. Further, according to the test signals supplied to the three source-side test lines 143*a* to be connected to the source electrodes 144*b*, the pixels RPX, GPX, BPX of each color can be arbitrarily driven to perform mixed color display. Therefore, more various tests can be performed. The number of test terminals 145 is same as that of the test lines 143.

As described before, according to this embodiment, the display section AA includes the coloring pixels exhibiting different colors such as the red pixels RPX, green pixels GPX, and blue pixels BPX. The source lines 120 are connected to the coloring pixels of different colors of the red pixels RPX, green pixels GPX, and blue pixels BPX. The test circuit 140 at least includes the test lines 143 through which the test signals are transmitted, and the test TFTs 144 that are connected to the test lines 143 and the source lines 120 to control the supply of the test signals. The number of the source-side test lines 143a included in the test lines 143 and connected to the source lines 120 is same as the number of colors of the coloring pixels of red pixels RPX, green pixels GPX, and blue pixels BPX. According to such a configuration, with the test circuit 140, the single color display may be performed by driving selectively each of the single coloring pixels of the red pixels RPX, green pixels GPX, and blue pixels BPX or the mixed color display may be performed by driving simultaneously the multiple coloring pixels of the red pixels RPX, green pixels GPX, and blue pixels BPX. Accordingly, various tests can be performed. In such a configuration including the same number of source-side test lines 143a as the number of colors of the coloring pixels of the red pixels RPX, green pixels GPX, and blue pixels BPX, the arrangement area of the test circuit 140 may be increased. However, as described before, the terminal connection lines 151 are arranged while overlapping the test circuit 140 and therefore, the arrangement efficiency of the terminal connection lines 151 and the test circuit 140 is improved and the frame area can be kept small.

Third Embodiment

A third embodiment of the present invention will be described with reference to FIG. 14. In the third embodiment, a switching circuit 54 is further included in the first embodiment. Configurations, operations, and effects similar to those of the first embodiment will not be described.

Figure 14:
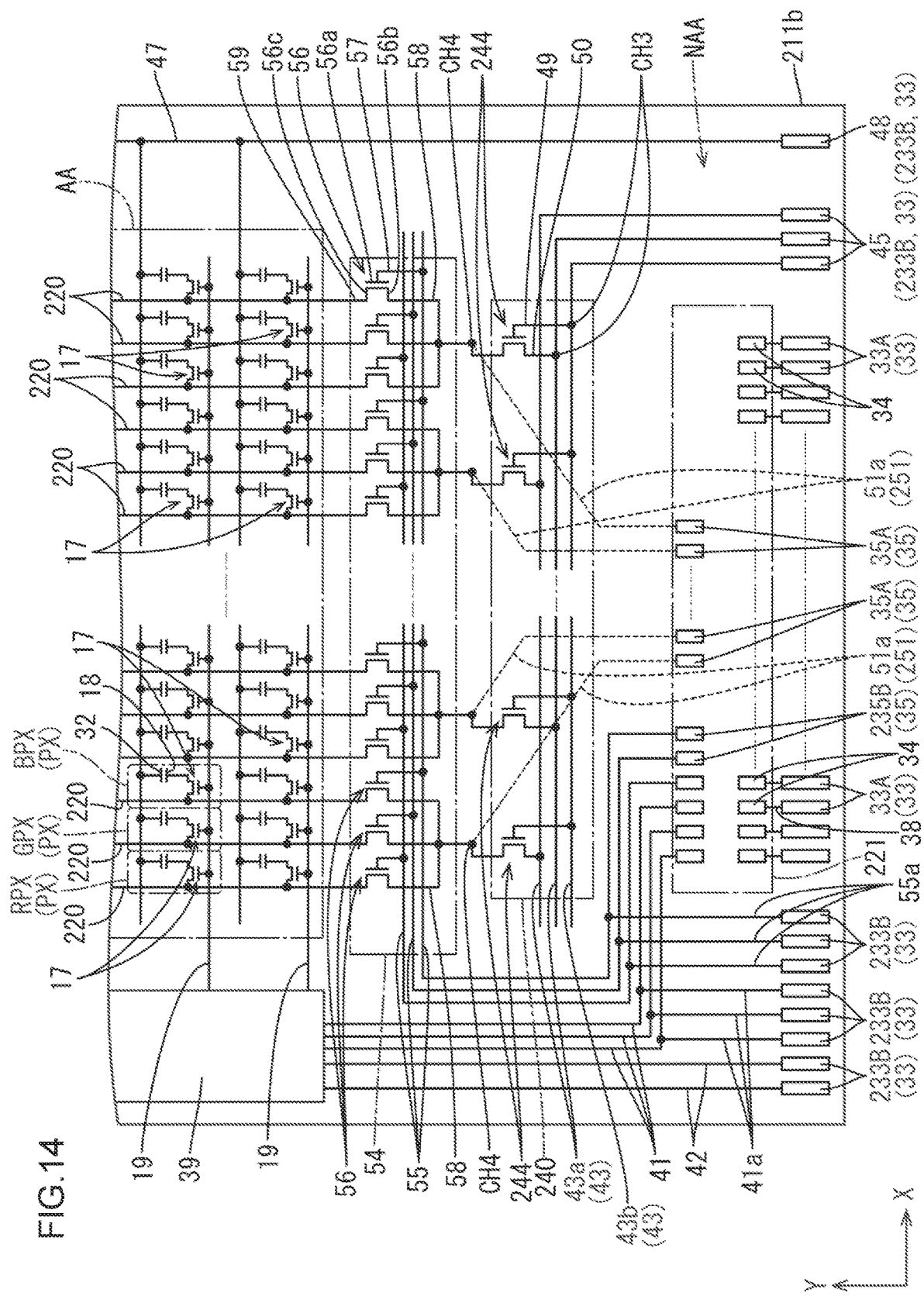
FIG. 14 is a plan view illustrating a configuration of traces in a mounting area of an array board where the driver and the flexible printed circuit board are mounted according to a third embodiment of the present invention.

As illustrated in FIG. 14, the non-display section NAA of an array board 211b of this embodiment includes the switching circuit (a RGB switching circuit) 54 that is sandwiched between the display section AA and each of a test circuit 240 and terminal connection lines 251. Namely, the test circuit 240 and the terminal connection lines 251 are connected to source lines 220 of the display section AA via the switching circuit 54. The switching circuit 54 has a switching function of distributing image signals included in output signals supplied from a driver 221 to each of the source lines 220.

In more detail, the switching circuit 54 is formed in a horizontally elongated rectangular area extending in the row direction (the X-axis direction) similar to the test circuit 240. The switching circuit 54 at least includes selection signal lines 55 and switching TFTs 56. The selection signal lines 55 extend in the X-axis direction that is perpendicular to (crosses) the Y-axis direction or the extending direction of the source lines 220 and selection signals for switching are transmitted therethrough. The switching TFTs 56 are connected to the selection signal lines 55, the source lines 220, and the terminal connection lines 251 and control the supply of image signals (signals). The switching TFTs 56 are arranged linearly in the X-axis direction (the extending direction of the selection signal lines 55) and the number of the switching TFTs 56 is same as the number of source lines 220. Namely, each of the switching TFTs 56 sends image signals to each of the source lines 220. The switching circuit 54 includes the switching TFTs 56 to be connected to the source lines 220 that are connected to the red pixels RPX, the switching TFTs 56 to be connected to the source lines 220 that are connected to the green pixels GPX, and the switching TFTs 56 to be connected to the source lines 220 that are connected to the blue pixels BPX, and the switching TFTs 56 are arranged in repeated sequence along the X-axis direction.

The switching TFT 56 includes a channel portion formed of the semiconductor film, the gate electrode 56a, the source electrode 56b and the drain electrode 56c. The gate electrode 56a is disposed to overlap the channel portion on an upper layer side while having the gate insulation film therebetween. The source electrode 56b and the drain electrode 56c are disposed on an upper layer side of the gate electrode 56a via the first interlayer insulation film. The switching TFT 56 has a configuration substantially same as that of the test TFT 44 (see FIG. 10) of the first embodiment. The gate electrode 56a of the switching TFT 56 is connected to the selection signal line 55 via the gate relay line 57. The drain electrode 56c of the switching TFT 56 is connected to the source line 220 via the drain relay line 59. The source electrode 56b of the switching TFT 56 is connected to the terminal connection line 251 and the test circuit 240 via the source relay line 58. The source relay line 58 is routed to short-circuit the source electrode 56b of the switching TFT 56 including the drain electrode 56c to be connected to the source line 220 connected to the red pixel RPX, the source electrode 56b of the switching TFT 56 including the drain electrode 56c to be connected to the source line 220 connected to the green pixel GPX, and the source electrode 56b of the switching TFT 56 including the drain electrode 56c to be connected to the source line 220 connected to the blue pixel BPX. In other words, the source relay line 58 is branched into several lines between each source electrode 56b of the three switching TFTs 56 and the connection point (the contact hole CH4) connected to the terminal connection line 251 and the test circuit 240. According to such a configuration, the image signals supplied from the terminal connection line 251 and the test signals supplied from the test circuit 240 can be distributed to each of the pixels RPX, GPX, BPX exhibiting different colors. Accordingly, the number of the terminal connection lines 251 and the number of the test TFTs 244 on the test circuit 240 are approximately one third (denominator is equal to the number of colors) of that in the first embodiment. A connection structure of the gate electrode 56a and the gate relay line 57, a connection structure of the gate relay line 57 and the scan line 55, and a connection structure of the source electrode 56b and the source relay line 58 are similar to the respective connection structures of the test circuit 40 described in the first embodiment.

The selection signal lines 55 include three signal lines including a signal line connected to the gate electrode 56a of the switching TFT 56 having the drain electrode 56c that is to be connected to the source line 220 connected to the red pixel RPX, a signal line connected to the gate electrode 56a of the switching TFT 56 having the drain electrode 56c that is to be connected to the source line 220 connected to the green pixel GPX, and a signal line connected to the gate electrode 56a of the switching TFT 56 having the drain electrode 56c that is to be connected to the source line 220 connected to the blue pixel BPX. Namely, the number of selection signal lines 55 is equal to the number of colors exhibited by the pixels PX. If the selection signal is supplied to the selection signal line 55 in charge of the red pixel RPX, the switching TFT 56 in charge of the red pixel RPX is driven and the image signal is supplied to the source line 220 connected to the red pixel RPX. Similarly, if the selection signal is supplied to the selection signal line 55 in charge of the green pixel GPX, the switching TFT 56 in charge of the green pixel GPX is driven and the image signal is supplied to the source line 220 connected to the green pixel GPX. If the selection signal is supplied to the selection signal line 55 in charge of the blue pixel BPX, the switching TFT 56 in charge of the blue pixel BPX is driven and the image signal is supplied to the source line 220 connected to the blue pixel BPX. Each of the selection signal lines 55 is connected to a corresponding one of the panel-side control input terminals 235B and receives the selection signal from the driver 221. Each selection signal line 55 is connected to a switching circuit test line 55a for supplying test selection signals to the switching circuit 54. A terminal of the switching circuit test line 55a is connected to a corresponding one of non-driver external connection terminals 233B. The selection signal lines 55 are made of second metal film, which is not illustrated.

As described before, according to this embodiment, the display section AA includes the coloring pixels exhibiting different colors such as the red pixels RPX, green pixels GPX, and blue pixels BPX. The source lines 220 are connected to the coloring pixels of different colors of the red pixels RPX, green pixels GPX, and blue pixels BPX. The switching circuit 54 is sandwiched between the display section AA and the test circuit 240 and connected to the source lines 220. Signals are selectively supplied to the source lines 220 via the switching circuit 54. The terminal connection lines 251 are connected to the source lines 220 via the switching circuit 54. According to such a configuration, with the switching circuit 54, the coloring pixels of each color of the red pixels RPX, green pixels GPX, and blue pixels BPX can be selectively driven at certain gradation by supplying signals selectively to the source lines 220. In a configuration including such a switching circuit 54, the frame area may be increased by the arrangement area of the switching circuit 54. However, since the number of the terminal connection lines 251 is greatly decreased and the terminal connection lines 251 are arranged while overlapping the test circuit 240 as described before, the arrangement efficiency of the terminal connection lines 251 and the test circuit 240 is improved and the frame area can be kept small.

Fourth Embodiment

A fourth embodiment of the present invention will be described with reference to FIGS. 15 and 16. In the fourth embodiment, a common electrode 332 has a separated structure different from that of the first embodiment. Configurations, operations, and effects similar to those of the first embodiment will not be described.

Figure 15:
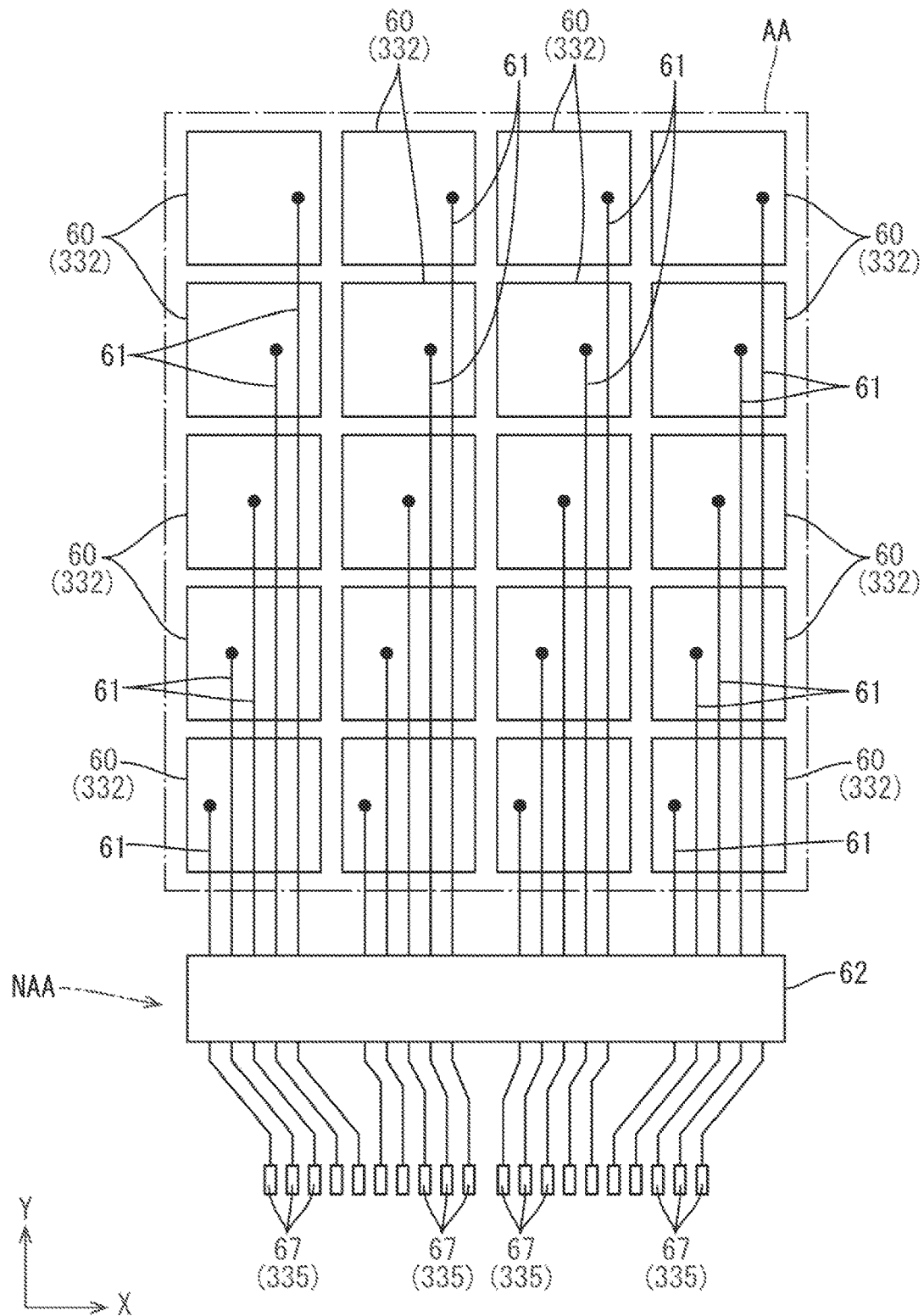
FIG. 15 is a general plan view illustrating a configuration of a common electrode and a test circuit in an array board according to a fourth embodiment of the present invention.
Figure 16:
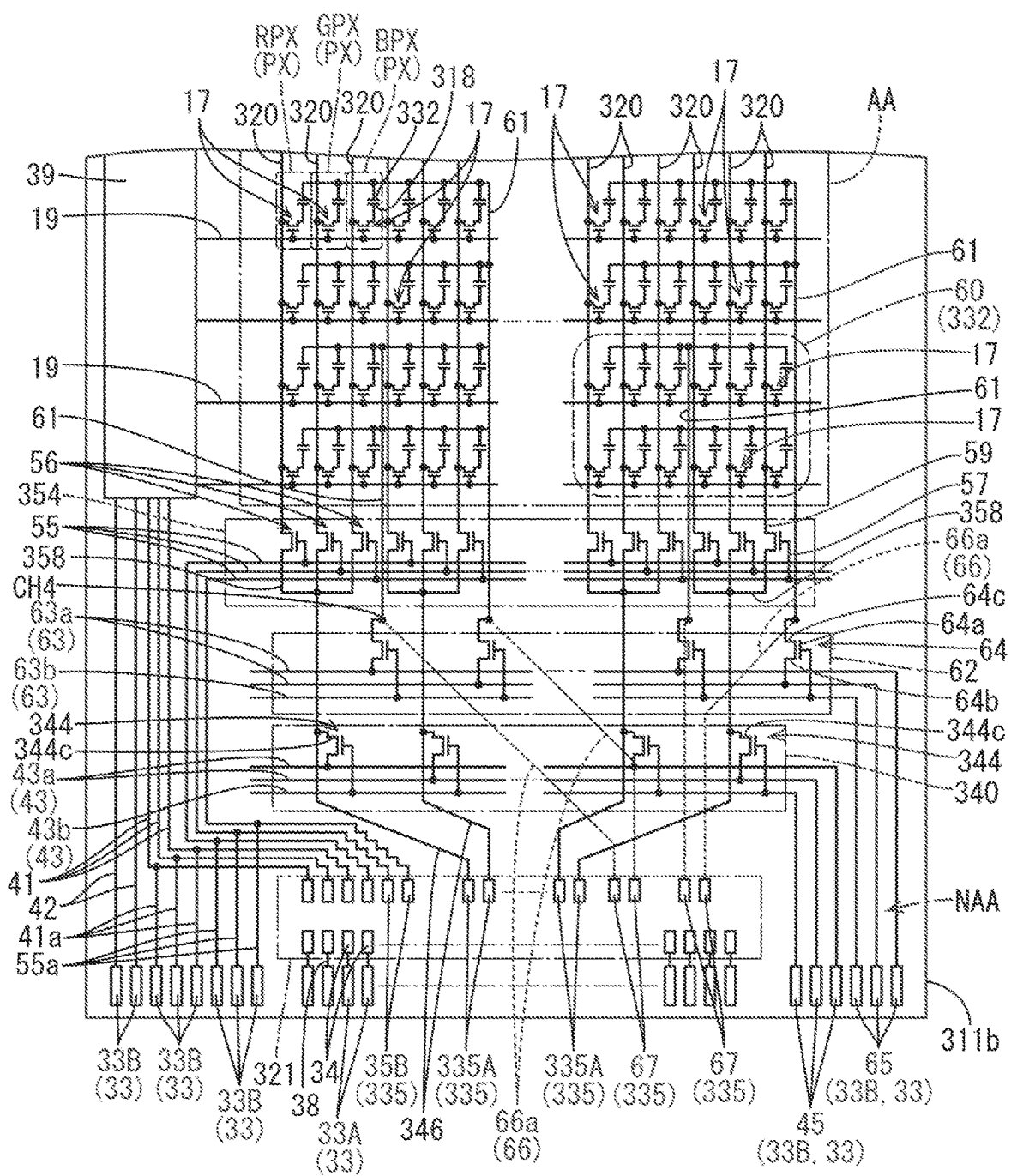
FIG. 16 is a plan view illustrating a configuration of traces in a mounting area of an array board where the driver and the flexible printed circuit board are mounted.

As illustrated in FIGS. 15 and 16, the common electrode 332 according to this embodiment includes separated common electrodes 60. The separated common electrodes 60 are arranged in an area ranging the pixels PX with respect to the X-axis direction and the Y-axis direction. The separated common electrodes 60 are arranged in a matrix in the X-axis direction and the Y-axis direction. With such a separated configuration of the common electrode 443, the same potential (a common potential) can be supplied to each of the separated common electrodes 60 and a potential (an electrostatic capacitance) of each separated common electrode 60 can be independently detected. Therefore, the liquid crystal panel can include a built-in touch panel pattern and each separated common electrode 60 can be used as a part of the touch panel pattern. Each of the separated common electrodes 60 is connected to a separated common electrode connection line (a common electrode pixel connection line) 61 separately. Namely, each of the pixels PX included in the display section AA is connected to the separated common electrode connection line 61 and the source line (pixel electrode pixel connection line) 320. The separated common electrode connection line 61 is made of the second metal film (not illustrated) or the third metal film similar to the source line 320. An area where the separated common electrodes 60 are formed is illustrated with a dot-and-dash line in FIG. 16.

Furthermore, as illustrated in FIG. 16, an array board 411b of this embodiment includes a second test circuit 62 for testing the separated common electrodes 60 in the non-display section NAA. The second test circuit 62 is between the switching circuit 354 and the test circuit 340. The second test circuit is formed in a horizontally elongated rectangular area extending in the X-axis direction. The second test circuit 62 is connected to the separated common electrode connection lines 61 arranged on the display section AA to test the separated common electrodes 60 included in the pixels PX of the display section AA. The second test circuit 62 at least includes second test lines 63, second test TFTs 64, and second test terminals 65. The second test lines 63 extend in the X-axis direction and test signals are transmitted therethrough. The second test TFTs 64 are connected to the second test lines 63 and the second test circuit 62 and configured to control the supply of the test signals. The second test terminals 65 are connected to ends of the second test lines 63 opposite from the second test TFTs 64. On the second test circuit 62, the second test lines 63 are relatively closer to the panel-side input terminals 335 and the second test TFTs 64 are relatively closer to the display section AA. The second test line 63 of the second test circuit 62 according to this embodiment is made of the second metal film and the second test terminal 65 has a single-layered structure of the first metal film, which is not illustrated, or has a multiple-layered structure of the first metal film and the transparent electrode material (the first transparent electrode film or the second transparent electrode film).

As illustrated in FIG. 16, the second test TFTs 64 are arranged linearly along the X-axis direction and the number of the second test TFTs 64 is equal to the number of the separated common electrodes 60. Namely, the second test TFTs 64 supply test signals to each of the separated common electrodes 60 separately. The second test TFT 64 has a similar configuration as that of the test TFT 44 described in the first embodiment. The gate electrodes 64a and the source lines 64b are connected to the second test lines 63, and the drain electrodes 64c are connected to the separated common electrode connection lines 61. The second test TFT 64 has a configuration similar to that of the test TFT 44 of the first embodiment. The gate electrodes 64a and the source lines 64b are connected to the second test lines 63, and the drain electrodes 64c are connected to the separated common electrode connection lines 61. A connection structure connecting the second test TFT 64 to the second test line 63 and the separated common electrode connection line 61 is similar to the connection structure connecting the test TFT 44 to the test line 43 and the source line 20 of the first embodiment (refer FIGS. 11 and 12) and will not be described in detail. The second test lines 63 included in the second test circuit 62 include test lines (second source-side test lines 63a) connected to the gate electrodes 64a of the second test TFTs 64 having the source electrodes 64b connected to the separated common electrode connection lines 61 connected to the odd-numbered separated common electrodes 60 from an end in the Y-axis direction (a front side in FIG. 16) and a test line (a second gate-side test line 63b) connected to the gate electrodes 64a of the second test TFTs 64 having the source electrodes 64b connected to the separated common electrode connection lines 61 connected to the even-numbered separated common electrodes 60 from the end. Therefore, if the test signals are supplied alternately to the two second source-side test lines 63a to be connected to the source electrodes 64b, the odd-numbered separated common electrodes 60 and even-numbered separated common electrodes 60 from the end in the Y-axis direction are driven alternately according to the test signals. Accordingly, it can be tested with the second test circuit 62 whether short-circuit is caused between the odd-numbered separated common electrodes 60 and the even-numbered separated common electrodes 60 from the end in the Y-axis direction.

Furthermore, as illustrated in FIG. 16, common electrode terminal connection lines (terminal connection lines) 66 connecting the separated common electrode connection lines 61 and the panel-side input terminals 335 are arranged in the non-display section NAA of the array board 311b according to this embodiment. Signals input to the panel-side input terminals 335 from the driver 321 are transmitted to the separated common electrode connection lines 61 via the common electrode terminal connection lines 66, and the transmitted signals are supplied to the separated common electrodes 60. The common electrode terminal connection lines 66 are illustrated with broken lines in FIG. 16. Among the panel-side input terminals 335, those connected to one ends of the common electrode terminal connection lines 66 are separated common electrode terminals (terminals) 67. The common electrode terminal connection lines 66 are disposed to overlap the test circuit 340 and the second test circuit 62 via the insulation film (not illustrated) that is same as that of the first embodiment. Specifically, the common electrode terminal connection lines 66 are made of the third metal film (not illustrated) same as that of the first embodiment and insulation is established between the common electrode terminal connection lines 66 and the first metal film, which is not illustrated, (such as the test lines 343 and the second test lines 63) via the insulation film same as that in the first embodiment (see FIG. 11). At least a part of the common electrode terminal connection line 66 overlaps the terminal connection line 346 via the insulation film. Therefore, compared to an arrangement that the common electrode terminal connection lines are not overlapped with the test circuit 340 and the second test circuit 62 and arranged adjacent to them in the Y-axis direction or an arrangement that the terminal connection lines 346 and the common electrode terminal connection lines 66 are routed exclusively, the area in the Y-axis direction for arranging the common electrode terminal connection lines 66, the test circuit 340, and the second test circuit 62 is reduced. Accordingly, the frame area of the array board 311b can be reduced and display resolution can be enhanced preferably. Furthermore, the arrangement variety of the common electrode terminal connection lines 66, the test circuit 340, and the second test circuit 62 is sufficiently increased. The test circuit 340 and the second test circuit 62 are not used when signals are input to the panel-side input terminals 335. Therefore, in the arrangement that the test circuit 340 and the second test circuit 62 are overlapped with the common electrode terminal connection lines 66 via the insulation film, the signals transmitted to the common electrode terminal connection lines 66 are less likely to be influenced by the noise.

As illustrated in FIG. 16, the separated common electrode terminals 67 are positioned off from the separated common electrode connection lines 61, respectively, in the X-axis direction (the direction perpendicular to the extending direction of the separated common electrode connection lines 61). The common electrode terminal connection lines 66 include obliquely extending portions 66a that extend obliquely with respect to the Y-axis direction (the extending direction of the separated common electrode connection lines 61). Some of the common electrode terminal connection lines 66 include the obliquely extending portions 66a overlapping one of the second test circuit 62 and the test circuit 340 and some of the common electrode terminal connection lines 66 include the obliquely extending portions 66a overlapping both of the second test circuit 62 and the test circuit 340. The obliquely extending portion 66a of the common electrode terminal connection line 66 extends from a connection point connected to the separated common electrode connection line 61 toward the separated common electrode terminal 67 for a certain length and overlaps the second test circuit 62 or/and the test circuit 340. According to such a configuration, the obliquely extending portions 66a of the common electrode terminal connection lines 66 can be arranged while using the arrangement area of the second test circuit 62 and the test circuit 340. Therefore, the common electrode terminal connection lines 66 can be routed in a compact fan shape with more steep lines. Accordingly, the frame area can be reduced. The drain relay line 346 connected to the drain electrode 344c of the test TFT 344 is connected to the source relay line 358 of the switching circuit 354 at one end thereof and is connected to the panel-side image input terminal 335A at another end thereof.

As described before, according to this embodiment, the display section AA includes the pixels PX arranged in a matrix, and the pixels PX at least include the pixel electrodes 318 to which a potential is applied according to the supplied signal and the common electrode 332 to which a common potential is applied. The common electrode 332 is arranged in an area ranging the pixel electrodes 318 and includes the separated common electrodes 60 arranged in a matrix. The pixel connection lines include the source lines 320 connected to the pixel electrodes 318 and the separated common electrode connection lines 61 connected to the respective separated common electrodes 60. The terminal connection lines include at least the terminal connection lines connected to the source lines 320 or the terminal connection lines connected to the separated common electrode connection lines 61 (the common electrode terminal connection lines 66). According to such a configuration, the pixel electrodes 318 are supplied with a potential according to the signal supplied via the source lines 320, and the separated common electrodes 60 included in the common electrodes 332 are supplied with a common potential supplied via the separated common electrode connection lines 61. Display with gradation according to the potential difference between each pixel electrode 318 and the common electrode 322 is performed in each pixel PX. In a configuration that the terminal connection lines including the common electrode terminal connection lines 66 connected to the separated common electrode connection lines 61, the common potential supped to the panel-side image input terminals 335A is transmitted to the separated common electrode connection lines 61 via the common electrode terminal connection lines 66 that are the terminal connection lines overlapping the test circuit 340.

The terminal connection lines selectively include the common electrode terminal connection lines 66 that are to be connected to the separated common electrode connection lines 61. The test circuit 340 is connected to the source lines 320 to test the source lines 320. The second test circuit 62 for testing the common electrode terminal connection lines 66 is provided between the test circuit 340 and the display section AA. The common electrode terminal connection lines 66 connected to the separated common electrode connection lines 61 are provided to overlap the second test circuit 62 in addition to the test circuit 340 via the insulation film. According to such a configuration, it can be tested with the second test circuit 62 whether short-circuit is caused between the adjacent separated common electrodes 60 and it can be tested with the test circuit 340 whether short-circuit is caused between the adjacent pixel electrodes 318. In such a configuration including the second test circuit 62, the frame area may be increased by the arrangement area for the second test circuit 62. However, the common electrode terminal connection lines 66, which are the terminal connection lines, are disposed to overlap the test circuit 340 and the second test circuit 62 so that the arrangement efficiency of the common electrode terminal connection lines 66, which are the terminal connection lines, the test circuit 340, and the second test circuit 62 is improved and the frame area can be kept small.

Other Embodiments

The present invention is not limited to the embodiments, which have been described using the foregoing descriptions and the drawings. For example, embodiments described below are also included in the technical scope of the present invention.

(1) Each of the above embodiments includes the terminal connection lines overlapping the test TFTs. However, the terminal connection lines may be provided not to overlap the test TFTs. In such a configuration, the plane arrangement of the contact hole through which the terminal connection line is connected to the source line may be adjusted and the length of the drain relay line connected to the drain electrode of the test TFT and the source line may be adjusted.

(2) In each of the above embodiments, each metal film has a single-layered structure. However, each metal film may have an alloy structure or a multiple-layered structure.

(3) Other than the above embodiments, specific material used for each metal film and each insulation film may be altered as appropriate.

(4) As a modified embodiment of the fourth embodiment, the switching circuit may not be included and the test circuit may be directly connected to the source lines. The switching circuit and the test circuit may not be included.

(5) Each of the first to third embodiments includes the liquid crystal panel that includes an FFS mode as an operation mode. However, other liquid crystal panels are also included in the scope of the present invention, for example, a liquid crystal panel that includes an in-plane switching (IPS) mode or a vertical alignment (VA) mode as an operation mode is also included in the scope of the present invention.

(6) In each of the above embodiments, the driver is directly mounted on the array board of the liquid crystal panel with a COG technology. The driver may be mounted on the flexible printed circuit board and the flexible printed board may be mounted on the array board with a Chip on Film (COF) technology.

(7) In each of the above embodiments, the gate circuit is arranged on one long-side edge of the array board. The gate circuit may be arranged on another long-side edge of the array board. Other than that, the present invention may be applied to the configuration including a pair of gate circuits arranged on a pair of long-side edges of the array board. In such a configuration, the gate lines arranged in the column direction may be alternately connected to one gate circuit and the other gate circuit or one gate line may be driven at both ends thereof.

(8) Other than each of the above embodiments, the specific arrangement of the terminals, the specific routing paths of the lines, and the specific number of the terminals and the lines may be altered appropriately.

(9) In each of the above embodiments, the liquid crystal panel includes the pixels of three colors including red, green, and blue. However, the present invention may be applied to a liquid crystal panel including the pixels of four colors including yellow in addition to red, green, and blue.

(10) In each of the above embodiments, each TFT and each circuit includes a CG silicon thin film as the semiconductor film. Other than that, for example, a semiconductor film formed from amorphous silicon or oxide semiconductor may be used.

(11) Each of the above embodiments includes the liquid crystal panel having a vertically-long rectangular shape. However, liquid crystal panels having a horizontally-long rectangular shape or a square shape are also included in the scope of the present invention. Furthermore, liquid crystal panels having a circular shape or an elliptic shape are also included in the scope of the present invention.

(12) Each of the above embodiments may further include a functional panel, such as a touch panel and a parallax barrier panel (a switching liquid crystal panel), layered and attached to the liquid crystal panel.

(13) The liquid crystal display device according to the above embodiments includes the edge-light type backlight unit. However, the liquid crystal display device may include a direct backlight unit.

(14) The transmission type liquid crystal display devices each including the backlight unit, which is an external light source, are described as the embodiments. However, reflection type liquid crystal display devices that use outside light to display images are also included in the scope of the present invention. The reflection type liquid crystal display devices do not require backlight units. Further, semi-transmission type liquid crystal display devices are also included in the scope of the present invention.

(15) Each of the above embodiments includes the TFTs as switching components of the liquid crystal display device. However, liquid crystal display devices that include switching components other than TFTs (e.g., thin film diodes (TFDs)) may be included in the scope of the present invention. Furthermore, black-and-white liquid crystal display devices, other than color liquid crystal display device, are also included in the scope of the present invention.

(16) The liquid crystal display devices including the liquid crystal panels as the display panels are described as the embodiments. However, display devices that include other types of display panels (e.g., plasma display panels (PDPs), organic EL panels, electrophoretic display panels (EPD), and micro electro mechanical system (MEMS) display panels) are also included in the scope of the present invention.

EXPLANATION OF SYMBOLS

11: liquid crystal panel (display panel), 11*a*: CF board (counter board), 11*b*, 211*b*, 311*b*, array board (active matrix substrate), 17: pixel TFT (pixel), 18, 318: pixel electrode (pixel), 20, 120, 220, 320: source line (pixel connection line, pixel electrode pixel connection line), 32, 332: common electrode (pixel), 35, 335: panel-side input terminal (terminal), 35A, 335A: panel-side image input terminal (terminal), 40, 140, 240, 340: test circuit, 43, 143: test line, 44, 144, 244, 344: test TFT (test switching component), 51,251: terminal connection line, 51a: obliquely extending portion, 52: insulation film, 54, 354: switching circuit, 60: separated common electrode, 61: separated common electrode connection line, 62: second test circuit, 66: common electrode terminal connection line (terminal connection line), 66a: obliquely extending portion, 67: separated common electrode terminal (terminal), AA: display section (pixel section), BPX: blue pixel (coloring pixel), GPX: green pixel (coloring pixel), PX: pixel, RPX: red pixel (coloring pixel)

The invention claimed is:

1. An active matrix substrate comprising:
   a pixel section including a plurality of pixel electrodes and a plurality of separated common electrodes, the plurality of pixel electrodes being arranged in a first direction and a second direction intersecting the first direction, the plurality of separated common electrodes being arranged in the first direction and the second direction, each of the separated common electrode corresponding to at least two of the pixel electrodes;
   a plurality of source lines each of which extends in the first direction and is connected to some of the plurality of pixel electrodes;
   a plurality of separated common electrode connection lines each of which extends in the first direction and is connected to corresponding one of the plurality of separated common electrodes;
   a test circuit section including a first test circuit portion being connected to the plurality of source lines and a second test circuit portion being connected to the plurality of separated common electrode connection lines; and
   an external connection terminal section including a plurality of external connection terminals receiving signals to drive the pixel section, wherein
   the test circuit section is arranged between the pixel section and the external connection terminal section.

2. The active matrix substrate according to claim 1, further comprising:
   a first test line being connected to the first test circuit portion; and
   a second test line being connected to the second test circuit portion and being different from the first test line.

3. The active matrix substrate according to claim 2, further comprising:
   a first test terminal being connected to the first test line; and
   a second test terminal being connected to the second test line.

4. The active matrix substrate according to claim 3, further comprising a non-display section being arranged outside the pixel section, wherein
   the test circuit section, the first test line, the second test line, the first test terminal, the second test terminal, and the external connection terminal section are arranged in the non-display section.

5. The active matrix substrate according to claim 1, wherein
   the first test circuit portion is formed in an elongated rectangular shape,
   the second test circuit portion is formed in an elongated rectangular shape, a location of the second test circuit portion is different from that of the first test circuit portion, and
   a long side of the first test circuit portion is arranged along a long side of the second test circuit portion.

6. The active matrix substrate according to claim 1, wherein the first test circuit portion and the second test circuit portion are arranged in the first direction.

7. The active matrix substrate according to claim 6, wherein the second test circuit portion is arranged between the pixel section and the first test circuit portion.

8. The active matrix substrate according to claim 1, further comprising a switching circuit section selectively supplying signals to the plurality of source lines, wherein
   the switching circuit section is arranged between the pixel section and the test circuit section.

9. The active matrix substrate according to claim 1, further comprising a driver driving the pixel section, wherein
   the driver is provided between the pixel section and the external connection terminal section.

10. The active matrix substrate according to claim 9, wherein the driver is provided between the test circuit section and the external connection terminal section.

11. The active matrix substrate according to claim 1, further comprising a flexible printed circuit board including a base member having insulating property and flexibility, the base member having a plurality of wiring patterns on its surface, wherein
    the external connection terminal section is connected to the flexible printed circuit board.

12. The active matrix substrate according to claim 11, further comprising a driver driving the pixel section, wherein
    the driver is provided on the flexible printed circuit board.

13. A display panel comprising:
    the active matrix substrate according to claim 1; and
    a counter substrate being bonded to the active matrix substrate.

* * * * *